(12) United States Patent
Astesiano et al.

(10) Patent No.: US 9,746,178 B2
(45) Date of Patent: Aug. 29, 2017

(54) LOW $NO_x$-EMISSION SELF-REGENERATIVE COMBUSTION SYSTEM

(71) Applicants: Danieli & C. Officine Meccaniche S.P.A., Buttrio (IT); Danieli Centro Combustion S.P.A., Cinisello Balsamo (IT)

(72) Inventors: Davide Astesiano, Genoa (IT); Claudio Leoncini, Genoa (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 1286 days.

(21) Appl. No.: 13/723,727

(22) Filed: Dec. 21, 2012

(65) Prior Publication Data
US 2013/0174765 A1  Jul. 11, 2013

(51) Int. Cl.
| | | |
|---|---|---|
| F23L 15/04 | (2006.01) |
| F23L 15/02 | (2006.01) |
| F23C 6/02 | (2006.01) |
| F23K 5/06 | (2006.01) |
| F23G 5/50 | (2006.01) |
| F23G 7/06 | (2006.01) |

(52) U.S. Cl.
CPC ............... *F23L 15/04* (2013.01); *F23C 6/02* (2013.01); *F23G 5/50* (2013.01); *F23G 7/068* (2013.01); *F23K 5/06* (2013.01); *F23L 15/02* (2013.01); *F23G 2900/55001* (2013.01); *F23K 2401/201* (2013.01); *F23N 2035/12* (2013.01); *F23N 2035/24* (2013.01); *Y02E 20/348* (2013.01)

(58) Field of Classification Search
CPC .................................. F23G 7/068; F23L 15/04
USPC ............................................................ 431/195
See application file for complete search history.

(56) References Cited

U.S. PATENT DOCUMENTS

| | | | | |
|---|---|---|---|---|
| 5,375,622 A | * | 12/1994 | Houston | ............... F16K 11/076 137/240 |
| 7,963,276 B2 | | 6/2011 | Weis | |
| 2004/0053180 A1 | * | 3/2004 | Poe | ........................ F23C 6/047 431/195 |
| 2011/0061576 A1 | | 3/2011 | Greco et al. | |

FOREIGN PATENT DOCUMENTS

| | | | | |
|---|---|---|---|---|
| CN | 2554493 | 6/2003 | | |
| CN | 101680556 | 3/2010 | | |
| DE | 19740788 C1 | * | 9/1998 | ............. F23C 3/002 |
| EP | 0715123 | 9/1997 | | |
| EP | 1126217 | 2/2005 | | |
| GB | 659328 | 10/1951 | | |

* cited by examiner

*Primary Examiner* — Avinash Savani
*Assistant Examiner* — Aaron Heyamoto
(74) *Attorney, Agent, or Firm* — Stetina Brunda Garred & Brucker

(57) ABSTRACT

A self-regenerative combustion system comprising a single burner, capable of operating both during the combustion step and the waste gas aspiration step, and a valve with four ways and three positions, capable of switching the regeneration and the on/off control (oxydizing agent end and waste gas end). The system is provided for obtaining the maximum efficiency, flexibility, minimum fuel consumption and minimum environmental impact with reduced NOx emissions.

16 Claims, 16 Drawing Sheets

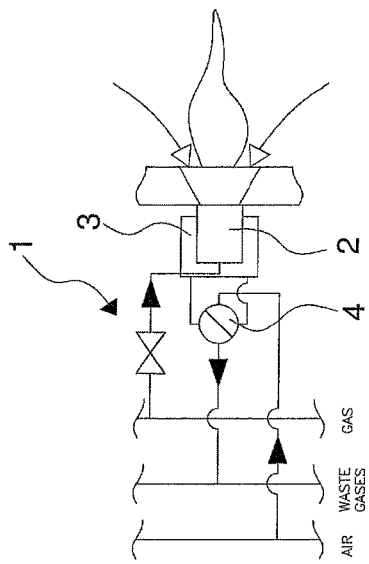
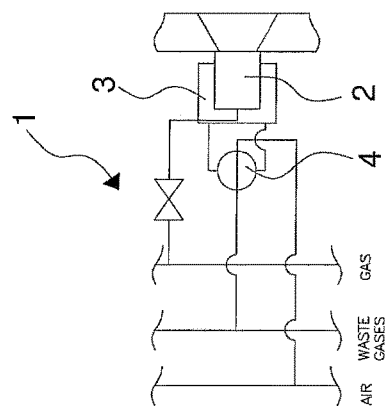
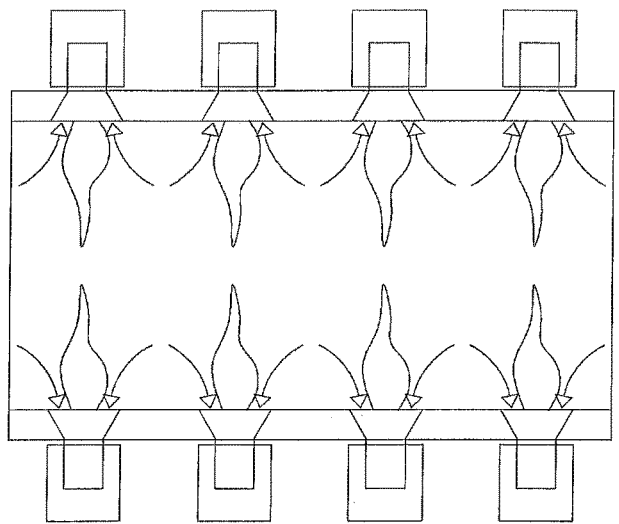
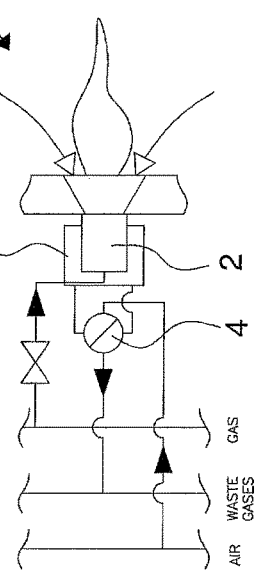
Fig. 4
Fig. 5a
Fig. 5b
Fig. 5c

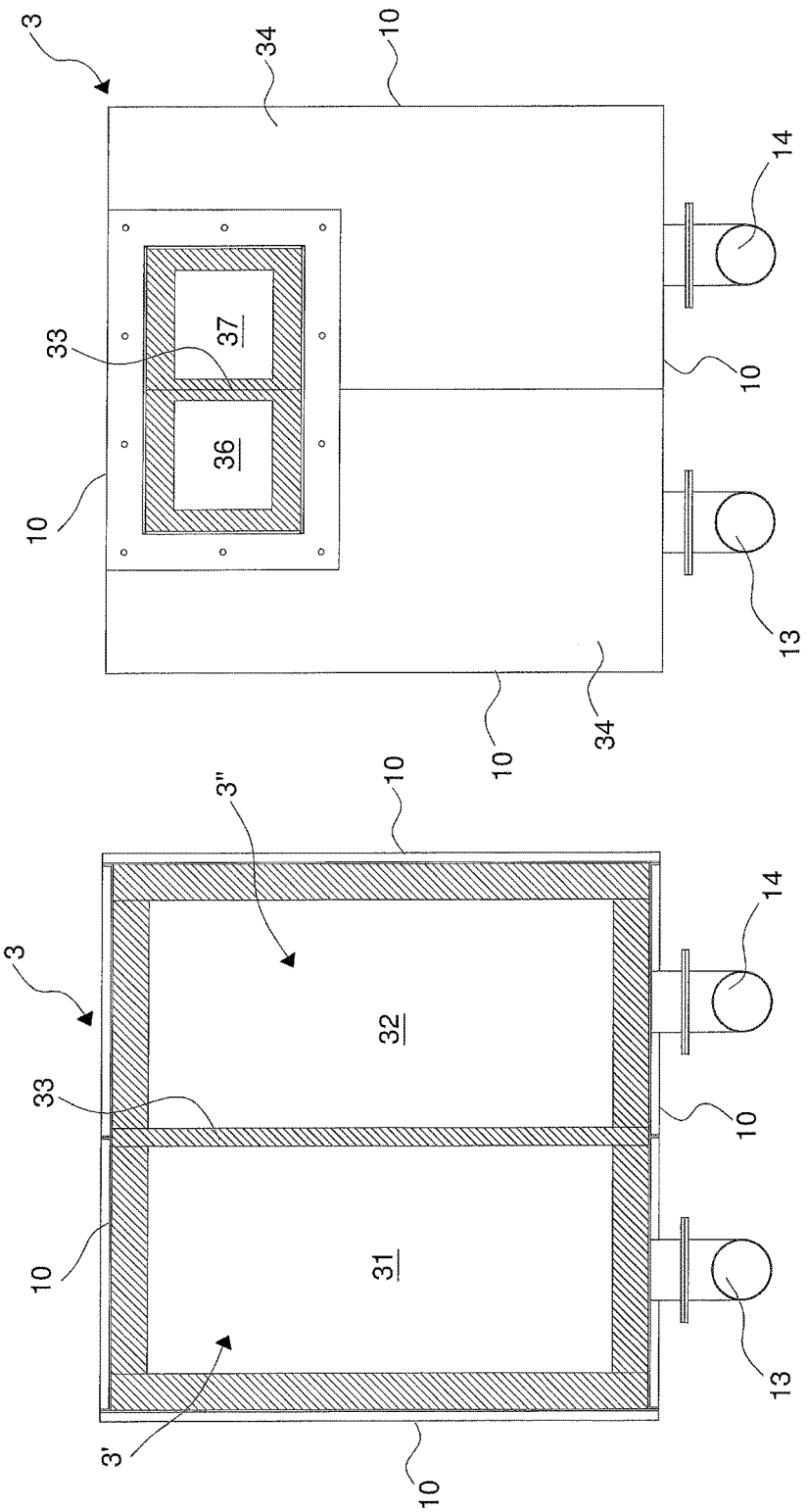

LOW NO$_x$-EMISSION SELF-REGENERATIVE COMBUSTION SYSTEM

FIELD OF THE INVENTION

The present invention relates to a low NOx-emission, self-regenerative combustion system suitable for heating furnaces and heat treatment furnaces.

PRIOR ART

In industrial plants, heating furnaces heat the charge by radiation whereas heat treatment furnaces heat the charge in a free atmosphere by convection through the high speed of the waste gases lapping it.

In recent years, the demand for reducing gas consumption in heating furnaces and in heat treatment furnaces has led the manufacturers to devise solutions capable of ensuring the utmost efficiency of their plants. In order to achieve such results it is known to preheat the oxydizing agent by means of heat exchange devices with the waste gases produced within the furnaces. Various devices for preheating the oxydizing agent have therefore been devised, which may be divided into two main families: centralized recuperators and local recuperators.

Centralized recuperators are usually installed in waste gas ducts. However, due to their material limits, dimensions and costs, centralized recuperators have relatively low efficiencies and are able to preheat the oxydizing agent at limited temperatures, about 550-600° C.

On the other hand, local recuperators are installed onboard of the burners and have the advantage of using the heat of the waste gases directly exiting the combustion chamber, having a higher temperature and thus the advantage of preheating the oxydizing agent to a higher level, with more efficiency.

Therefore, there are two families of burners provided with local built-in heat recovery systems:
self-recuperative burners;
regenerative burners.

Self-recuperative burners use a counter-current annular exchanger, have relatively low powers and are generally used on heat treatment plants.

Regenerative burners are able to develop higher powers suitable for heating furnaces. A heat recovery system, called regenerator, is installed onboard of each burner which stores the heat of the waste gases aspired by the burner in a first step and transfers it to the oxydizing agent in a second step.

It is known that regenerative burners work in pairs and alternately, while one of the two works during the combustion step, the other one works during the aspiration step for withdrawing the waste gases from the combustion chamber. Considering therefore a pair of regenerative burners, at the same time, while the heat inside one burner is transferred from the regenerator to the oxydizing agent, the heat inside the other burner is transferred from the waste gases to the regenerator. After a predetermined time, the regeneration cycle and the operation of the burners are inverted and the heat transferred in advance from the waste gases to the regenerator is transmitted to the oxydizing agent.

With the regenerative system, the waste gases exchange their heat with the regenerator at a temperature almost equal to that of the combustion chamber, being able to obtain, according to the efficiency of the regenerator, preheating temperatures of the oxydizing agent up to 150-200° C. less than those of the waste gases. For a heating furnace with a chamber temperature of 1200° C., the oxydizing agent temperature therefore reaches 1000-1050° C.; whereas, using a combustion system which provides for the oxydizing agent preheating through a centralized recuperator, the oxydizing agent temperature reaches at the most 550-600° C. Compared to preheated air (preheated through the centralized recuperator) burners, regenerative burners have large dimensions due to the larger volumes of the oxydizing agent involved and to the presence of the regenerator, and they imply plant design complications due to the complex management of fluids: delivery pipes for the oxydizing agent and waste gases pipes are provided for each burner so as to carry out the regeneration inversion cycles.

Moreover, each pair of burners is managed by valves for cycling the operation between one burner and the other, from the combustion step to the waste gas aspiration step, and vice versa.

Heating furnaces and heat treatment furnaces are sized for heating a predetermined amount of material to a predetermined temperature. Such input data correspond to a determined thermal power required and consequently installed on the plant.

Since regenerative burners work in pairs and, alternately, while one of the two works as a burner (combustion step) the other one gives no heat contribution to the system (waste gas aspiration step from the chamber), compared to conventional burners it is necessary to install twice the required thermal power to obtain the same installed power.

Using a pair of regenerative burners, which in the above operation in terms of thermal potential are equivalent to a single conventional burner, the following problems arise:
a) difficulty for positioning the burners due to their dimensions;
b) complications with piping and control systems;
c) NOx emissions increased by the higher temperature of the oxidizing agent.

With reference to problem a), compared to a furnace with conventional burners, the following options may be selected in the design stage to distribute the thermal power:
1) installing a number of regenerative burners equal to twice the number of conventional burners and having the same power as the conventional burners, i.e. a pair of regenerative burners in the above operation equals one conventional burner in terms of power;
2) installing a number of regenerative burners equal to the number of conventional burners and having overall twice the power of the conventional burners, i.e. a pair of regenerative burners in the above operation equals two conventional burners in terms of power.

It is known that, with the same power, the regenerative burner has larger overall dimensions compared to the equivalent conventional burner.

Option 1 (FIG. 1b) requires the installation of twice the burners compared to the conventional combustion system (FIG. 1a), with the advantage of achieving high flexibility and good thermal uniformity in the chamber. However, said option 1 is not always feasible in terms of space, both due to the large overall dimensions of the pair of burners and to the overall dimensions of the feeding pipes of the same burners.

Taking a side lower zone of a longitudinal beam furnace as a reference, the pitch and section of the longitudinal beams and the uprights is defined according to the charge and, therefore, the weight thereof. With the same charge, the larger the pitch the higher the weight weighing on each upright and the section of longitudinal beams and uprights will have to be larger. Accordingly, there will be a stronger skidmark on the charge. The smaller the pitch, the smaller the section of longitudinal beams and uprights. By increasing the number of uprights, there will be higher heat dispersion due to cooling and higher gas consumption.

Considering such preliminary remarks, having to install a pair of regenerative burners in a side wall of a furnace in the space of a conventional burner, it is highly likely that it might be necessary to increase the pitch of uprights and longitudinal beams (and thus the section and the skidmark accordingly) to make the pair of burners fit between one upright and the other. Otherwise, it is necessary to reduce the pitch (and increase the gas consumption accordingly) to make a single burner fit between one pitch and the other of the longitudinal beams.

Option 2 (FIG. 1c) provides for the installation of the same number of regenerative burners with respect to the number of conventional burners (FIG. 1a), said regenerative burners in this case having twice the power of the regenerative burners of option 1. As a consequence, the feeding pipes of the single regenerative burner have very large sections and the heat distribution inside the furnace is not optimal. In fact, although the running regenerative burners alternate in the combustion chamber, some zones are not covered by the heat input with the consequence of a not perfectly even charge heating as it would be in option 1 (FIG. 1b).

With reference to problem b), some important plant design problems (FIG. 2) intrinsic to the current regenerative system concept result from both choices (option 1 and 2).

While a conventional burner has two pipes (FIG. 2a—feeding of the oxydizing agent and of the fuel), six pipes are required for a pair of regenerative burners (FIG. 2b): two pipes for the oxydizing agent delivery, two pipes for the fuel delivery and two pipes for the combustion waste gas return; all the pipes being provided with respective on-off valves required for switching the regeneration.

If a cycling valve is used, four pipes are required for a pair of regenerative burners (FIG. 2c): one pipe for the oxydizing agent delivery, two pipes for the fuel delivery (and respective on-off valves) and one pipe for the combustion waste gas return.

If the control of such burners provides for the on/off system (FIG. 3), each pipe must further be provided with an automatic on-off valve. Accordingly, while a conventional burner has two on-off valves (FIG. 3a—one valve on the oxydizing agent delivery and one valve on the fuel delivery), a pair of regenerative burners has six on-off valves (FIG. 3b): two valves on the oxydizing agent delivery, two valves on the fuel delivery and two valves on the combustion waste gas return. If a cycling valve is used, the on-off valves are reduced to four (FIG. 3c): one valve on the oxydizing agent delivery, two valves on the fuel deliveries and one valve on the combustion waste gas return pipe.

With reference to problem c), the emissions of nitrogen oxides and dioxides, better known as NOx, also change according to the oxydizing agent temperature: the higher the preheating temperature of the oxidizing agent, the higher the NOx emissions. It is therefore natural for the NOx emissions to be clearly higher in a regenerative burner where the oxydizing agent is preheated to 1050-1100° C. as compared to a burner with cold oxydizing agent or preheated to 500-550° C.

The need of providing a self-regenerative combustion system and a related combustion process that allows the above drawbacks to be overcome is therefore felt.

SUMMARY OF THE INVENTION

The primary object of the present invention is to provide a simpler and more compact self-regenerative combustion system which at the same time allows the NOx emissions to be reduced as compared to the known regenerative combustion systems.

A further object of the invention is to provide a self-regenerative combustion system capable of carrying out the two steps of current regenerative systems, combustion and waste gas aspiration, at the same time, using in the minimum configuration thereof a single burner in place of the pair of burners currently required.

Another object of the invention is to provide a related combustion process that always allows very low NOx emissions to be obtained.

The present invention therefore aims to achieve the above objects by providing a low NOx-emission self-regenerative combustion system which, according to claim 1, comprises
  a single burner configured to introduce fuel in a combustion chamber and provided inside with at least two first chambers separated from each other and configured to respectively introduce oxydizing agent into said combustion chamber and receive, at the same time, combustion waste gases aspired from said combustion chamber, or vice versa;
  a regeneration body connected to the burner and provided with two second chambers separated from each other and configured respectively to preheat the oxydizing agent in its passage towards the burner and to recover heat from the combustion waste gases coming from the burner, or vice versa; a first chamber of said second chambers being in communication with a first chamber of the burner, and a second chamber of said second chambers being in communication with a second chamber of the burner;
  a switching valve, with four ways and three positions, provided with two third reciprocally separate chambers;
the system being configured so that one of the two third chambers, the first chamber of said second chambers and the first chamber of the burner define a first path, while the other of the two third chambers, the second chamber of said second chambers and the second chamber of the burner define a second path different from the first path, and configured so that in a first position of the switching valve the oxydizing agent follows the first path and the combustion waste gases follow the second path in the opposite direction;
in a second position of said switching valve the oxydizing agent follows the second path and the combustion waste gases follow the first path in the opposite direction; and in a third position of the switching valve, said valve closes the first path and the second path determining the shutdown of the combustion system.

A second aspect of the present invention provides a low NOx-emission combustion process executable by means of the above combustion system and a furnace with which said system cooperates defining a combustion chamber, the process cyclically comprising the following steps, according to claim 15:
  providing the switching valve configured in a first position;
  introducing in at least one combustion zone of said chamber oxydizing agent and fuel causing a first combustion reaction, the oxydizing agent following said first path so as to be preheated within the regeneration body in its passage towards the burner;
  aspirating part of the combustion waste gases from said at least one combustion zone, at the same time as first combustion reaction, the combustion waste gases following said second path so that part of their heat is recovered in their passage towards the switching valve;

after a predetermined interval of time, modifying the configuration of the switching valve from the first position to a second position;

introducing in said at least one combustion zone oxydizing agent and fuel causing a second combustion reaction, the oxydizing agent following the second path in opposite direction so to be preheated within the regeneration body in its passage towards the burner;

aspirating part of the combustion waste gases from said at least one combustion zone, at the same time as said second combustion reaction, the combustion waste gases following the first path in the opposite direction so that part of their heat is recovered in their passage towards the switching valve;

after a predetermined interval of time, modifying the configuration of the switching valve from the second position to the first position.

The self-regenerative combustion system, object of the present invention, is provided with a single burner capable of carrying out both steps of the regeneration cycle, i.e. the combustion step and the waste gas aspiration step, at the same time for locally preheating the oxydizing agent to the maximum efficiency through a regeneration body, or simply regenerator, and a four-way, three-position valve. Advantageously, said four-way, three-position valve allows both the switching of such steps and the on/off control of the burner (oxydizing agent end and waste gas end) to be managed. Thanks to the use of various combustion techniques, the combustion produced ensures very low NOx values.

The introduction of the oxydizing agent and of the aspiration of the combustion waste gases is carried out by devices such as fans and exhausters. Such devices produce pressure on the oxydizing agent and suction on the combustion waste gases that directly act on the regenerative system object of the present invention, respectively.

Such self-regenerative combustion system has the following advantages:

more compactness compared to the system based on the pair of regenerative burners;

smaller installation space compared to the system based on the pair of regenerative burners;

more efficiency compared to the conventional burner having the same power (less gas consumption);

maximum flexibility and maximum uniformity of the heat distribution in the chamber;

more simplicity of management compared to the system based on the pair of regenerative burners;

less plant design complications;

low polluting NOx emissions.

Advantageously, the connection pipes to the self-regenerative combustion system of the invention are minimized: the system requires a single oxydizing agent delivery pipe, a single fuel delivery pipe and a single active combustion waste gas return pipe. Through the four-way, three-position valve the system does not require further on-off valves (oxydizing agent end and waste gas end) for cycling the regeneration steps or for the on/off control of the system.

Compared to regenerative combustion systems, the structure of the system of the invention is greatly simplified.

The known regenerative combustion systems are formed by:

two regenerative burners, each comprising a diffuser for the oxydizing agent and a fuel introduction lance;

two separate regeneration bodies wherein a respective regeneration bed is inserted;

four on-off valves for switching the regeneration steps and carrying out the on/off control of the burner: in fact, each burner has one valve on the oxydizing agent delivery pipe and one valve on the combustion waste gas return pipe;

two on-off valves for the fuel: one valve for each burner.

On the other hand, the self-regenerative combustion system of the invention comprises:

a single burner, comprising a diffuser for the oxydizing agent and a fuel introduction lance;

a single regeneration body wherein two regeneration beds are provided;

a four-way, three position switching valve for both switching the regeneration steps and carrying out the on/off control of the burner;

a single on-off valve for the fuel.

Advantageously, the regeneration body is separate and is located outside the body of the single burner. This device allows a higher power to be obtained, since it is not necessary to limit the dimensions of the regenerator as in the case of a regenerator provided inside the burner body.

The system of the invention is directly connected to the plant pipes, i.e. to the oxydizing agent delivery pipe and to the waste gas return pipe of the plant, through the four-way switching valve.

Such system replicates the compactness and simplicity features typical of the traditional combustion systems with the advantage of preheating the oxydizing agent with more efficiency, typical of the regenerative systems formed by pairs of identical burners, using the heat of the waste gases directly aspired from the combustion chamber through regeneration beds formed by ceramic elements with a high percentage of alumina.

In other words, the self-regenerative combustion system of the invention reduces the fuel consumptions compared to the conventional burners, replicating the compactness and simplicity features thereof, as it does not require further centralized heat recovery devices for preheating the oxidizing agent.

In order to achieve such results, the burner body, the regeneration body and the four-way switching valve are each internally divided into two separate chambers in which the oxydizing agent and the combustion waste gases flow, respectively, in parallel and in opposite direction. Each chamber of the burner is in communication with a respective chamber of the regenerator and a respective chamber of the four-way switching valve by means of a connection pipe between regenerator and burner and between switching valve and regenerator.

Two operating steps of the system of the invention may be distinguished, explained hereinafter with reference to FIG. 5, having the same duration and which define the operating cycle of the system of the invention.

Step 1: such step corresponds to the position in FIG. 5a of the four-way switching valve 4 which, in a sequence, allows the oxidizing agent, at room temperature and coming from the delivery pipe, to fill the first of the two chambers of the switching valve, exit from said valve, pass into the first of the two pipes connecting the switching valve to the regeneration body 3, pass through the first of the two chambers of the regenerator, be preheated by a first of two regeneration beds, flow through the first of the two chambers of the burner 2 and be injected, through a first part of the burner diffuser holes, inside the furnace to be mixed and carry out the combustion with the fuel, injected into the furnace through a lance positioned into the burner; at the same time, the position in FIG. 5a of the four-way valve allows, in a sequence, the waste gases to be aspirated from the furnace through a second part of the diffuser holes, pass through the second of the two chambers of the burner, transfer heat to the second of the two regeneration beds, pass through the second of the two pipes connecting the switching valve to the regeneration body, enter the switching valve, fill the second of the two chambers of said valve and flow into the waste gas return pipes.

Step 2: such step corresponds to the position in FIG. 5b of the four-way switching valve 4 which, in a sequence, allows the oxidizing agent, at room temperature and coming from the delivery pipe, to fill the second of the two chambers of the switching valve, exit from said valve, pass into the second of the two pipes connecting the switching valve to the regeneration body 3, pass through the second of the two chambers of the regenerator, be preheated by a second of said two regeneration beds, flow through the second of the two chambers of the burner 2 and be injected, through said second part of the burner diffuser holes, inside the furnace to be mixed and carry out the combustion with the fuel, injected into the furnace by the same lance positioned into the burner; at the same time, the same position in FIG. 5b of the four-way valve allows, in a sequence, the waste gases to be aspirated from the furnace through said first part of the diffuser holes, pass through the first of the two chambers of the burner, transfer heat to the first of the two regeneration beds, pass through the first of the two pipes connecting the switching valve to the regeneration body, enter the switching valve, fill the first of the two chambers of said valve and flow into the waste gas return pipes.

A further step (Step 3) is also provided which comes into play when the self-regenerative system is off or when the heat potential control of the system provides for the on/off operation. In this case, Steps 1 and 2 may be identified as "on" steps whereas Step 3 as "off" step. Step 3 corresponds to the position in FIG. 5c of the four-way switching valve 4, which does not allow the oxidizing agent to pass, in a sequence, through one of the two chambers of the valve, through one of the two chambers of the regenerator and through one of the two chambers of the burner and thus carry out the combustion, or the waste gases to be aspirated from the furnace, pass through the other of the two chambers of the burner, pass through the other of the two chambers of the regenerator and through the other of the two chambers of the switching valve. During such Step 3, having a variable duration according to the plant heat requirements, the fuel is not injected into the furnace. At the same time, the two regeneration beds in the two chambers of the single regeneration body are not impinged by fluids, thereby not exchanging heat and remaining ready to transfer heat to the oxidizing agent or to absorb heat from the waste gases in one of the two "on" steps (Step 1 or Step 2).

During the above Steps 1 and 2, combustion occurs between oxidizing agent and fuel inside the combustion chamber. Considering the high temperature of the oxidizing agent and it being known that the NOx emissions increase as the oxydizing agent temperature increases, the use of combustion techniques has become necessary for the present invention which results in a large reduction in NOx.

The diffuser made of refractory material is sized for injecting the fuel into the chamber through a single hole located on an axis of the diffuser coincident with the longitudinal axis of the burner. The diffuser is also provided with a plurality of holes arranged on an ellipse, the center whereof lies on said axis of the diffuser.

Such plurality of holes arranged on an ellipse is used for both the injection of the oxidizing agent and for drawing the combustion waste gases produced by such combustion reaction. As an alternative, according to the operating step, half of the holes along the ellipse are used for injecting the oxydizing agent and the other half for drawing the combustion waste gases.

In order to reduce the NOx emissions, the self-regenerative system is configured for operating using combustion techniques adapted to reduce the flame temperature and reduce the NOx emissions, and optionally adapted to maximize a waste gas recirculation inside the burner.

The dependent claims describe preferred embodiments of the invention.

BRIEF DESCRIPTION OF THE FIGURES

Further features and advantages of the invention will appear more clearly from the detailed description of preferred but non-exclusive embodiments of a self-regenerative combustion system, illustrated by way of a non-limiting example with the aid of the accompanying drawing tables, wherein:

FIG. 4 shows a schematic section of a furnace provided with combustion systems according to the invention;

FIGS. 5a, 5b and 5c show a diagram of the combustion system according to the invention in three different operating modes;

FIG. 11 shows a sectional view along a third horizontal plane of the first component of the system of the invention;

FIG. 12 shows a sectional view along a fourth horizontal plane of the first component of the system of the invention;

The same reference numerals in the figures identify the same elements or components.

DETAILED DESCRIPTION OF PREFERRED EMBODIMENTS OF THE INVENTION

Figure 1C:
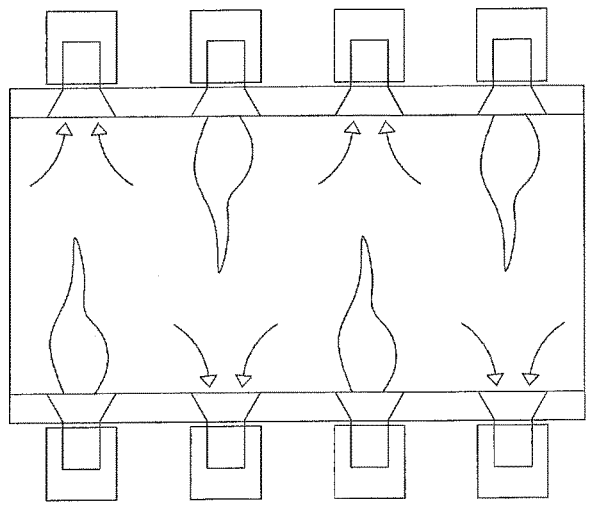
FIG. 1c shows a schematic section of a furnace provided with second known combustion systems with regenerative burners.
Figure 1B:
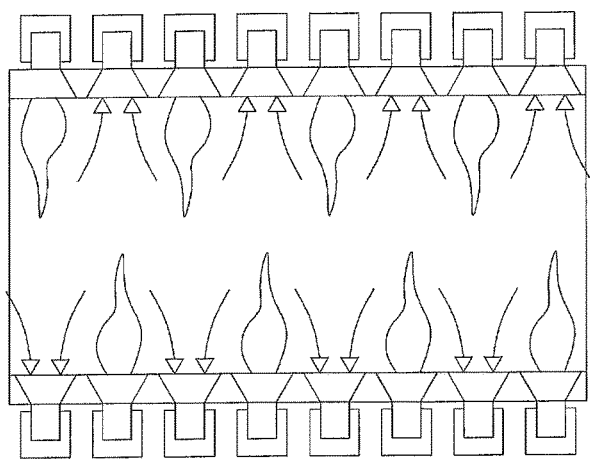
FIG. 1b shows a schematic section of a furnace provided with first known combustion systems with regenerative burners.
Figure 1A:
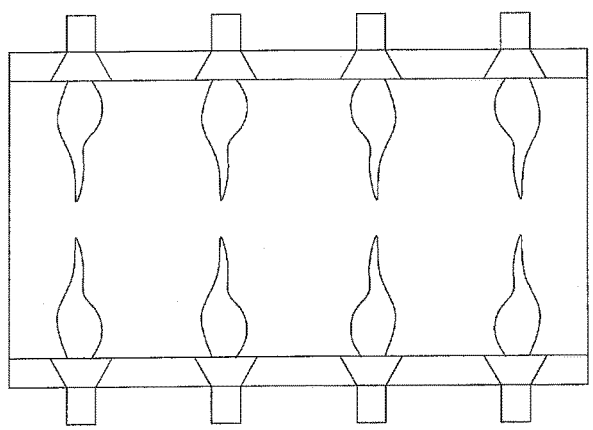
FIG. 1a shows a schematic section of a furnace provided with known combustion systems with conventional burners.
Figure 2A:
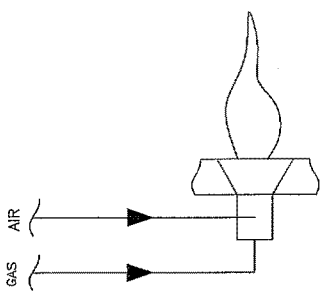
FIG. 2a shows a diagram of the pipes related to a conventional burner.
Figure 2B:
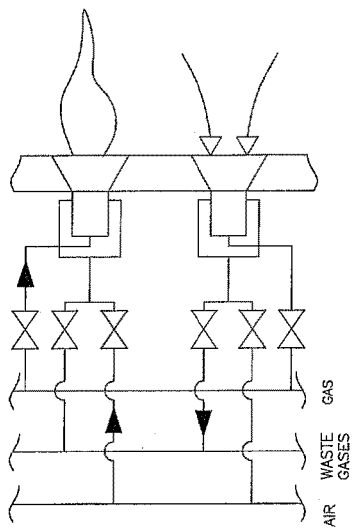
FIG. 2b shows a diagram of the pipes related to a pair of prior art regenerative burners.
Figure 2C:
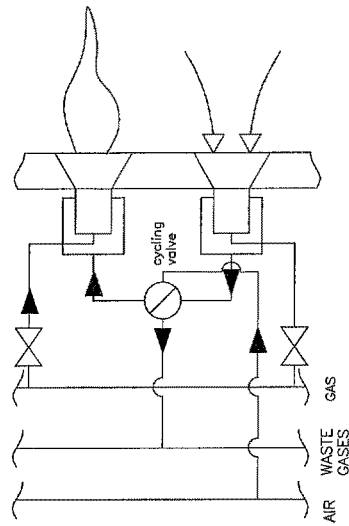
FIG. 2c shows a diagram of the pipes related to a pair of prior art regenerative burners with cycling valve.
Figure 3A:
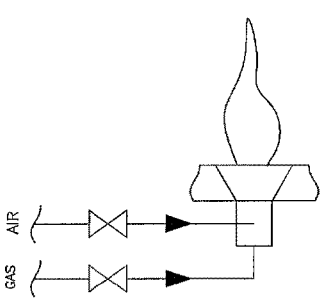
FIG. 3a shows a diagram of the pipes related to a conventional burner provided with on/off control system.
Figure 3B:
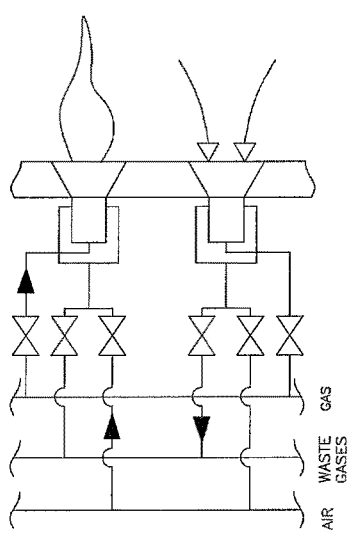
FIG. 3b shows a diagram of the pipes related to a pair of prior art regenerative burners provided with an on/off control system.
Figure 3C:
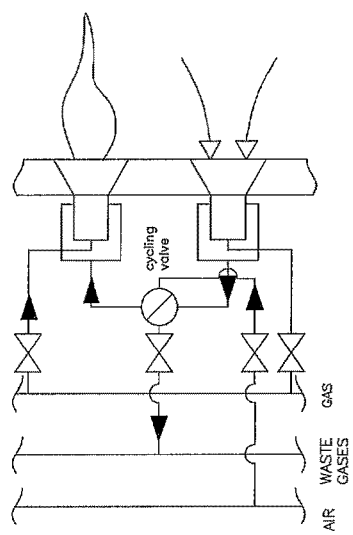
FIG. 3c shows a diagram of the pipes related to a pair of prior art regenerative burners provided with cycling valve and on/off control system.
Figure 6:
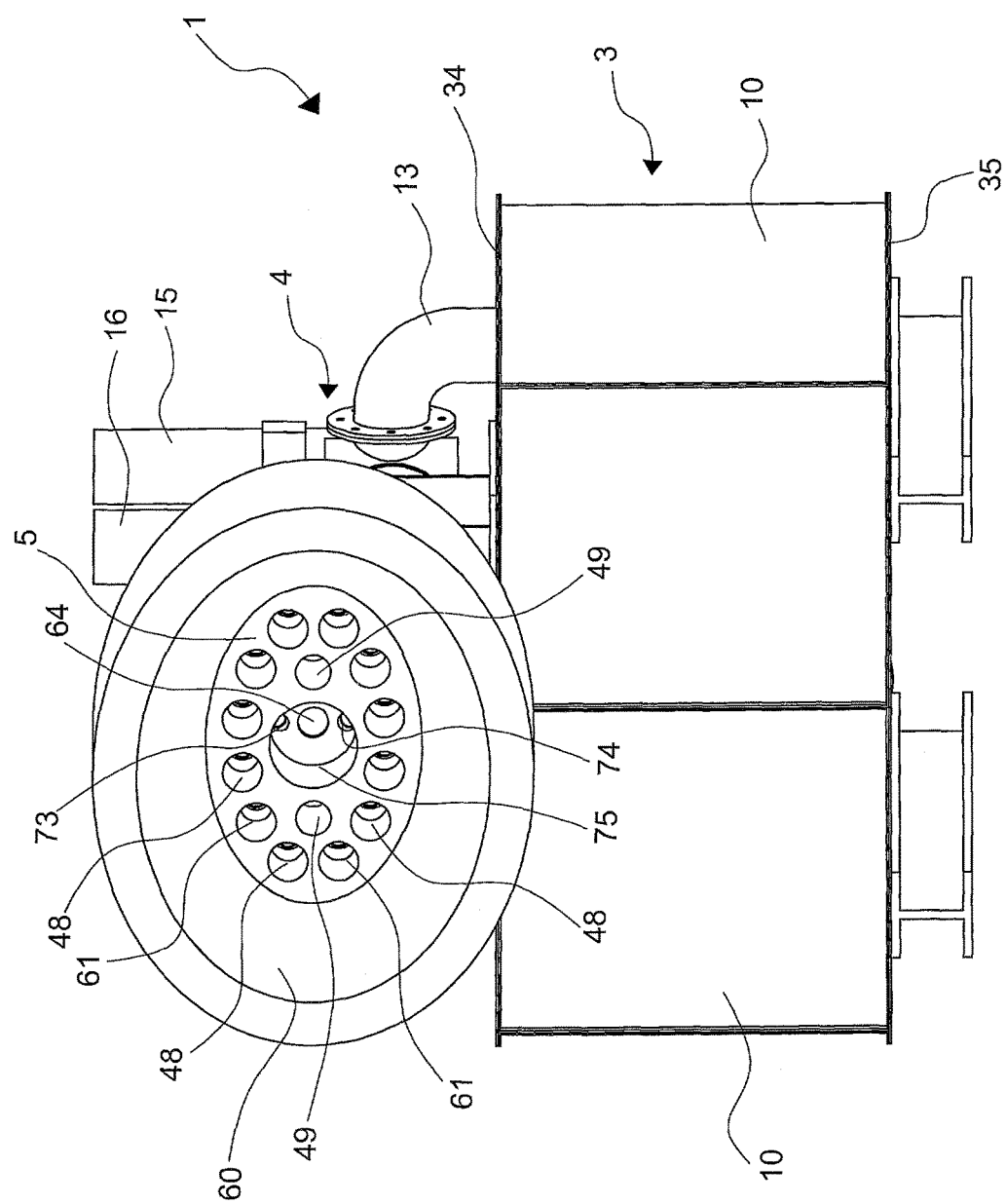
FIG. 6 shows a first perspective view of the system of the invention.
Figure 7:
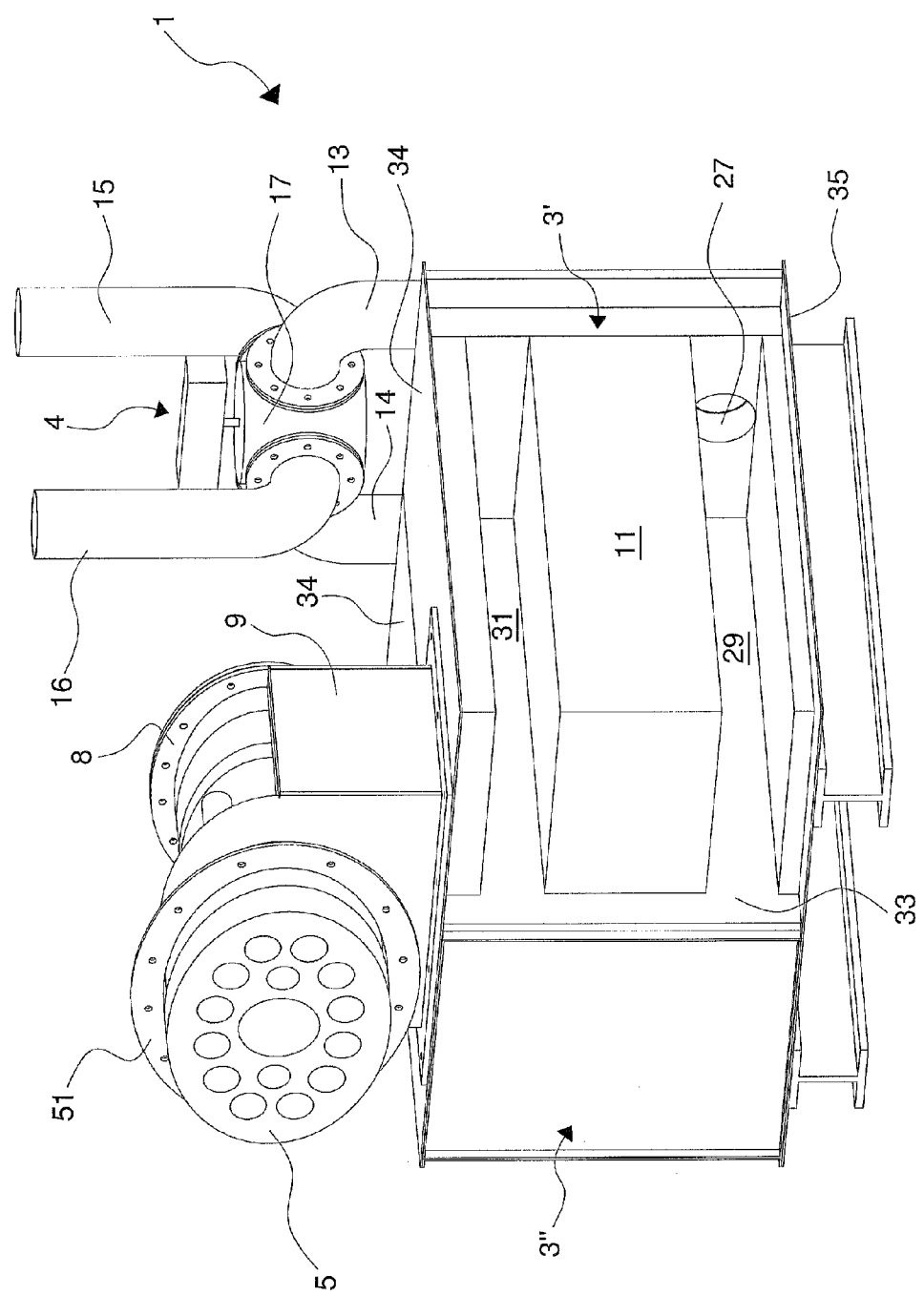
FIG. 7 shows a second perspective view of the system of the invention, partially open.
Figure 8:
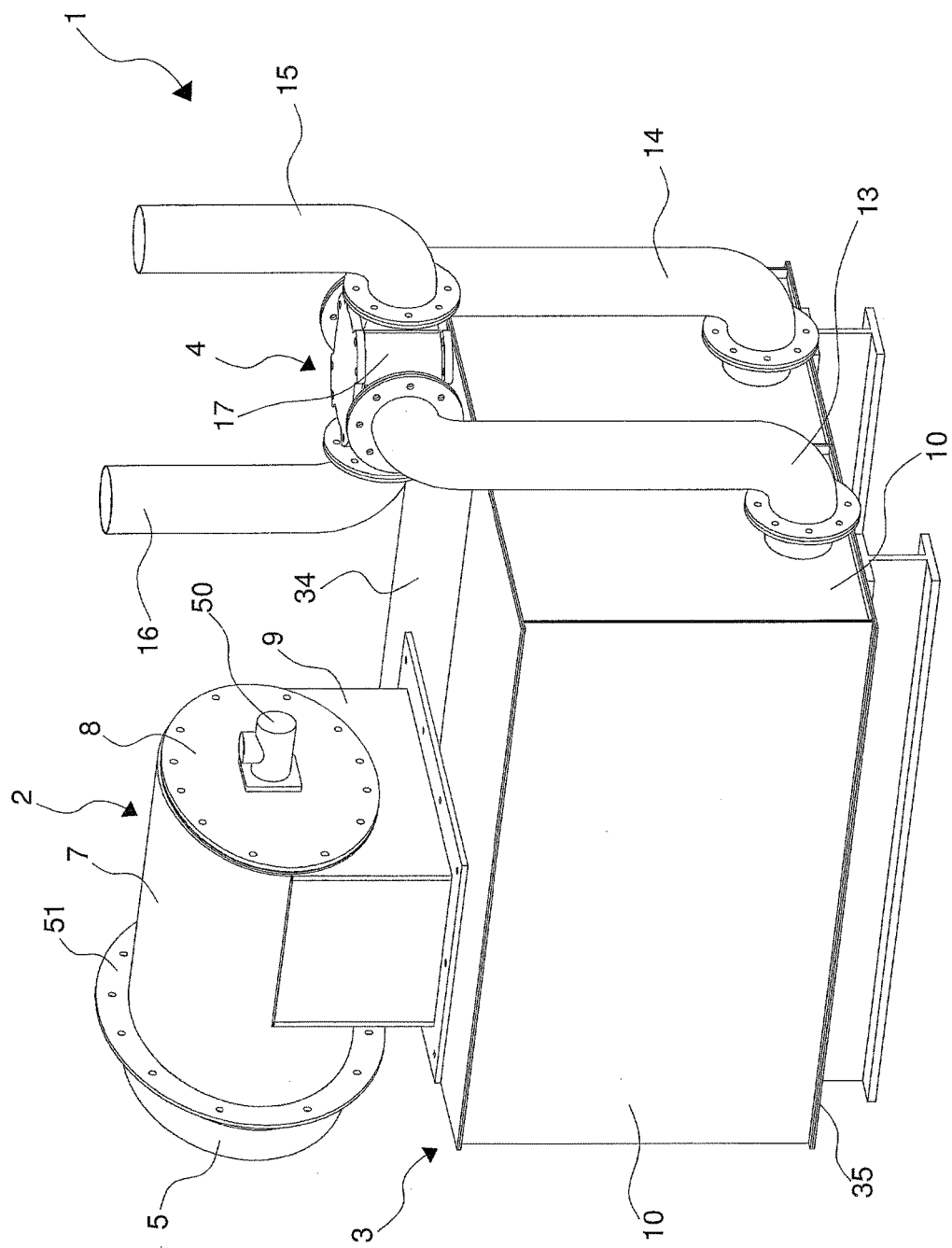
FIG. 8 shows a third perspective view of the system of the invention.
Figure 10:
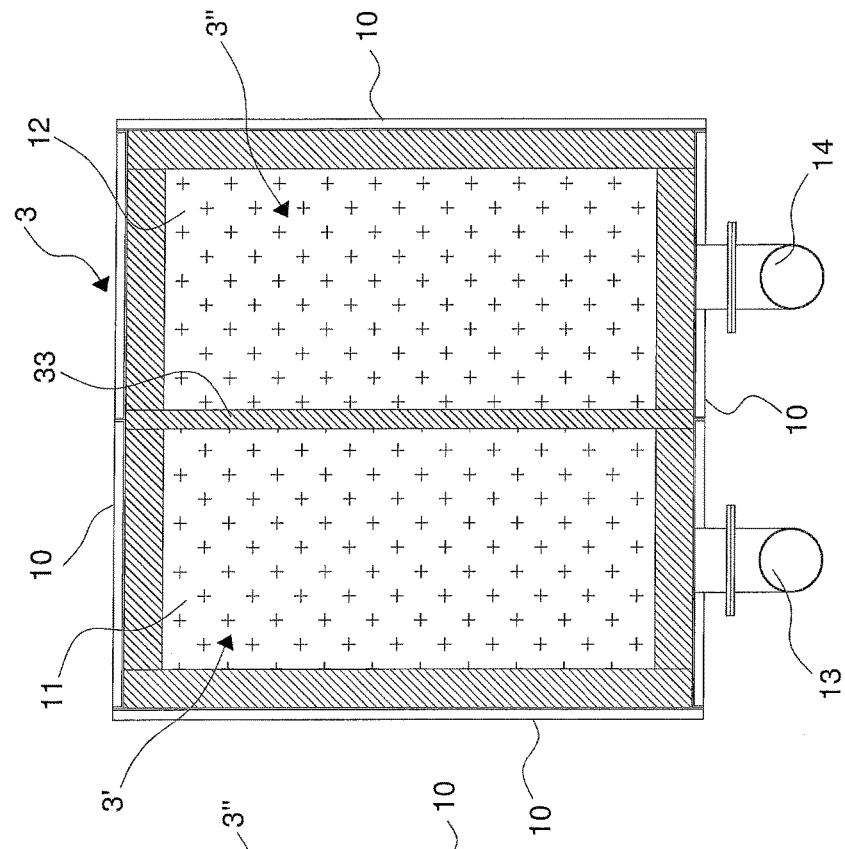
FIG. 10 shows a sectional view along a second horizontal plane of the first component of the system of the invention.
Figure 9:
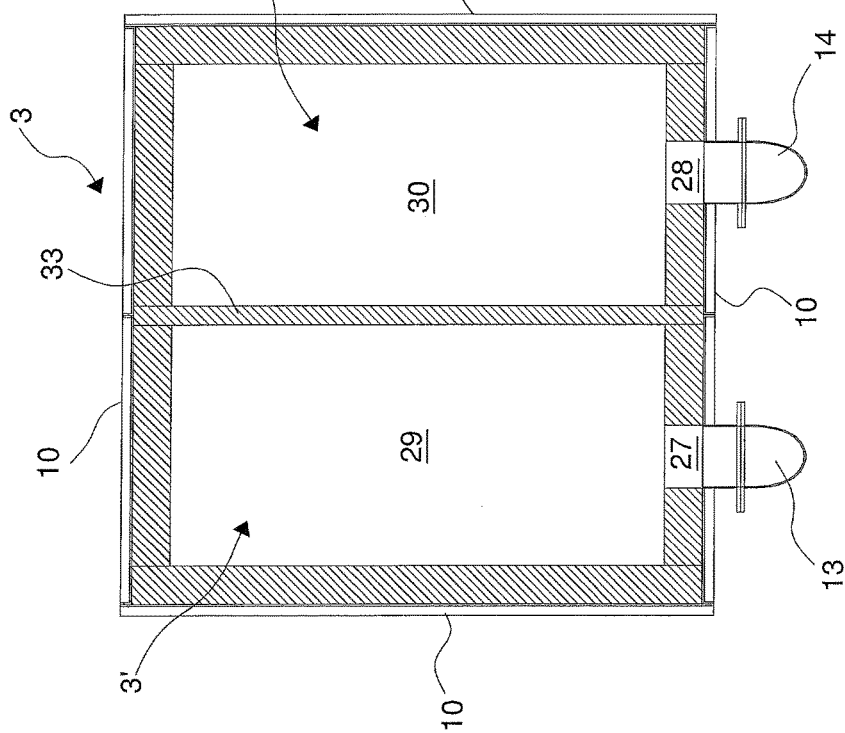
FIG. 9 shows a sectional view along a first horizontal plane of a first component of the system of the invention, common to all the embodiments.

With reference to FIGS. 4 to 24, there are shown preferred embodiments of a self-regenerative combustion system, globally indicated with reference numeral 1, adapted to carry out a low NOx-emission combustion with high speed flame using the concurrent combination of the air staging and/or internal waste gas recirculation and/or flame dilution techniques.

In all the embodiments thereof, the self-regenerative combustion system 1, object of the present invention, comprises:
 a single burner 2;
 a single fuel delivery pipe (not shown) to the burner, provided with respective on-off valve;
 a single regeneration body 3 wherein two regeneration beds 11, 12 are provided, preferably formed by balls with a high percentage of alumina or other suitable ceramic material;
 a four-way, three position switching valve for both switching the regeneration steps and carrying out the on/off control of the burner;
 two connection pipes 13, 14 between the switching valve 4 and the regeneration body 3;
 a connection pipe 9 between regeneration body 3 and burner 2.

The system of the invention is directly connected to the plant pipes, i.e. to a delivery pipe 15 of the oxidizing agent, for example air, and to a waste gas return pipe 16, through the four-way switching valve 4.

Burner 2, defining a longitudinal axis H, comprises:
 a hollow metal body 7 having a substantially elliptical cylindrical shape;
 a flange 51 for coupling the burner to the furnace casing;
 a combustion head or diffuser 5, with a substantially flat and elliptical shape, for the passage of the fuel gas and of the oxydizing agent from the hollow body 7 into the combustion chamber of the furnace, said diffuser 5 being accommodated into said hollow body 7 at a first end thereof;
 a cover 8, with a substantially flat and elliptical shape, thermally insulated therein, which closes said hollow body at a second end thereof;
 an introduction lance 6 for the fuel gas, longitudinally crossing the hollow body 7 and arranged along the longitudinal axis H of the burner;
 a pipe 50 for feeding the fuel gas, crossing cover 8 and connected to the introduction lance 6.

Cover 8 is pierced for the passage of the fuel gas introduction lance 6.

Pipe 50 for feeding the fuel gas puts the fuel delivery pipe (not shown) and the fuel introduction lance 6 in communication. As shall be explained in detail hereinafter, the fuel gas is directed into the combustion chamber through diffuser 5 into zones 66, 62 and 63 or only into zones 62 and 63.

Advantageously, the hollow body 7 of burner 2 is provided with at least two chambers 41, 42, reciprocally separated by a wall 43 of refractory material, whereof chamber 41 serves for feeding the oxydizing agent to diffuser 5 and chamber 42 serves for aspiring the combustion waste gases, or vice versa according to the operating step of the system of the invention.

Said chambers 41, 42 communicate, on one hand, with chambers 38, 39, respectively, which are also reciprocally separated by a refractory material 40 and provided into the connection pipe 9 between regeneration body 3 and burner 2. On the other end, instead, chambers 41, 42 directly or indirectly communicate with zones 66, 62, 63 of the combustion chamber through respective holes provided in the body of diffuser 5.

The ignition of the burner is carried out with a pilot for which a respective dedicated hole is made on diffuser 5. The flame detection is carried out with a UV cell (not shown). The UV cell is in communication with the flame through a respective dedicated hole on diffuser 5.

The regeneration body 3, with a substantially parallelepiped shape, comprises a top wall 34 whereon the connection pipe 9 to burner 2 is fitted; a bottom wall 35; and side walls 10 which connect the bottom wall 35 to the top wall 34.

The regeneration body 3 is internally divided into two chambers 3', 3'', not reciprocally communicating, by a partition wall 33 of refractory material.

Chamber 3' comprises a lower space 29 and an upper space 31, reciprocally separated by the regeneration bed 11. The lower space 29 of chamber 3' is delimited by three side walls 10, by the bottom wall or sole 35, by the partition wall 33 and by the regeneration bed 11. Said lower space 29 is in communication with pipe 13 through a hole 27 provided in a side wall 10.

The upper space 31 of chamber 3' is delimited by three side walls 10, by the top wall 34, by the partition wall 33 and by the regeneration bed 11. Said upper space 31 is in communication with pipe 9 through a hole 36 provided in the top wall 34. Likewise, chamber 3'' comprises an upper space 30 and a lower space 32, reciprocally separated by the regeneration bed 12.

The lower space 30 of chamber 3'' is delimited by three side walls 10, by the bottom wall or sole 35, by the partition wall 33 and by the regeneration bed 12. Said lower space 30 is in communication with pipe 14 through a hole 28 provided in a side wall 10.

The upper space 32 of chamber 3" is delimited by three side walls 10, by the top wall 34, by the partition wall 33 and by the regeneration bed 12.

Said upper space 32 is in communication with pipe 9 through a hole 37 provided in the top wall 34.

Hole 36 and hole 37 in the top wall 34 of the regeneration body are separated by wall 33.

The connection pipe 13 between regeneration body 3 and switching valve 4 is connected at one end to hole 27 and at the other end to a way or pipe 23 of the switching valve 4; whereas the connection pipe 14 is connected at one end to hole 28 and at the other end to a way or pipe 24 of the switching valve 4.

Figure 24A:
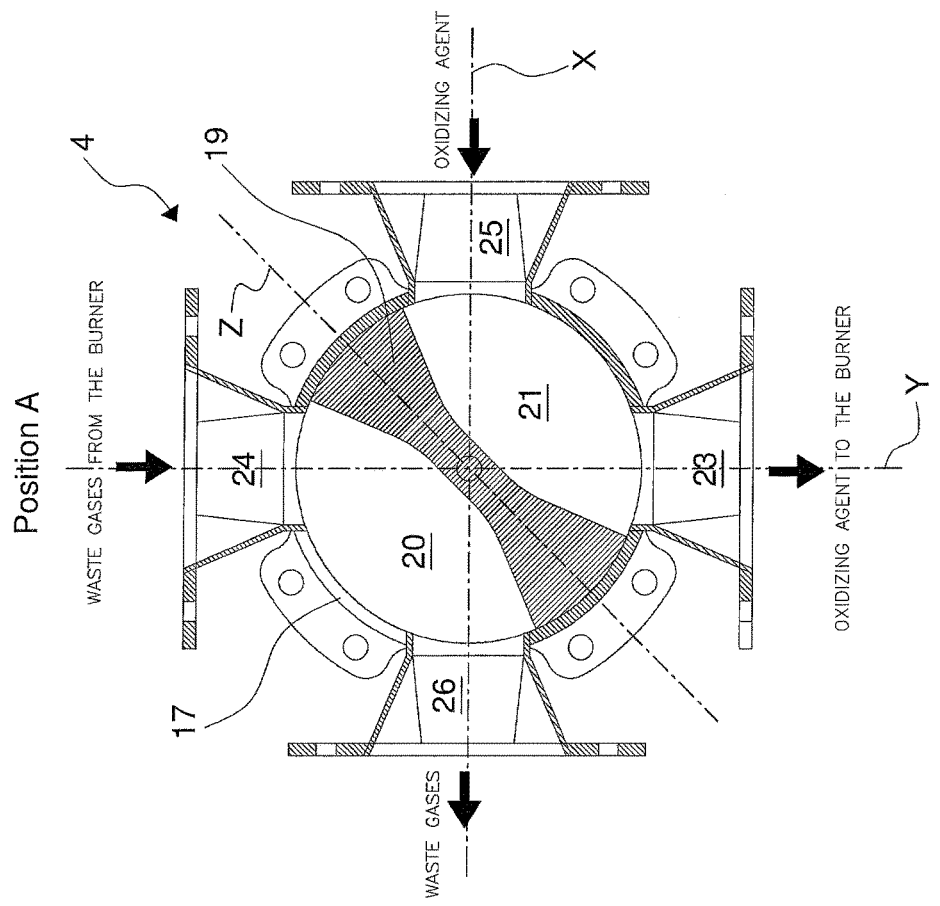
FIGS. 24a, 24b and 24c show sections of said third component in three different positions.
Figure 23:
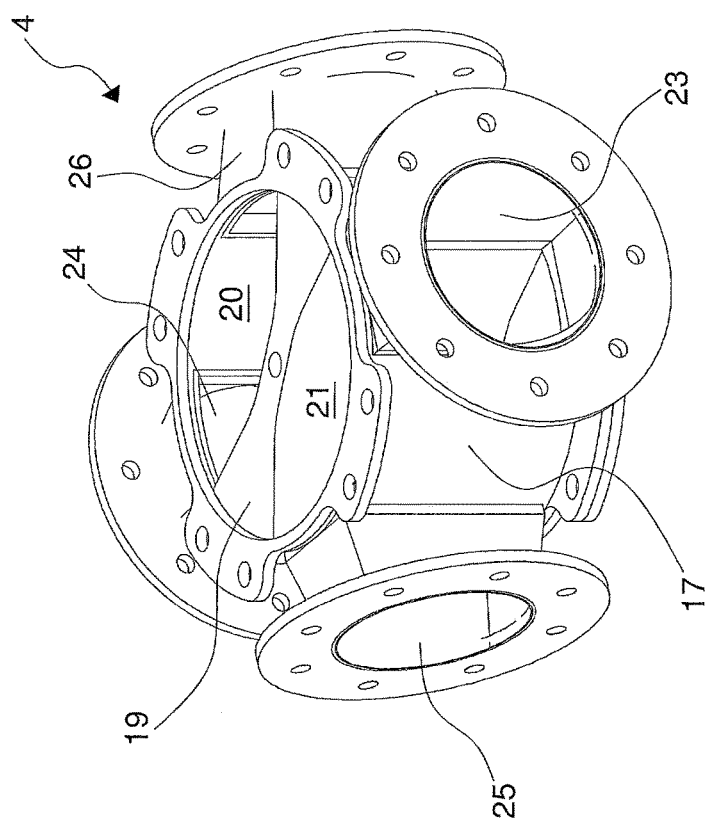
FIG. 23 shows a perspective view of a third component of the system of the invention, common to all the embodiments.
Figure 24C:
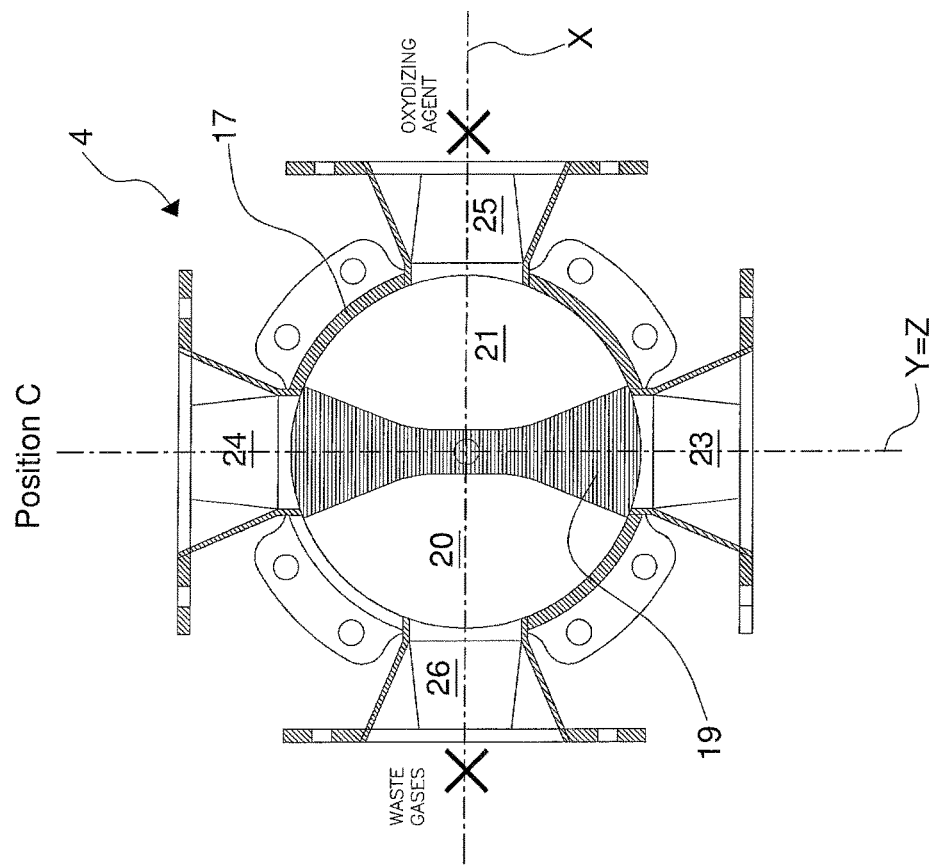
Figure 24B:
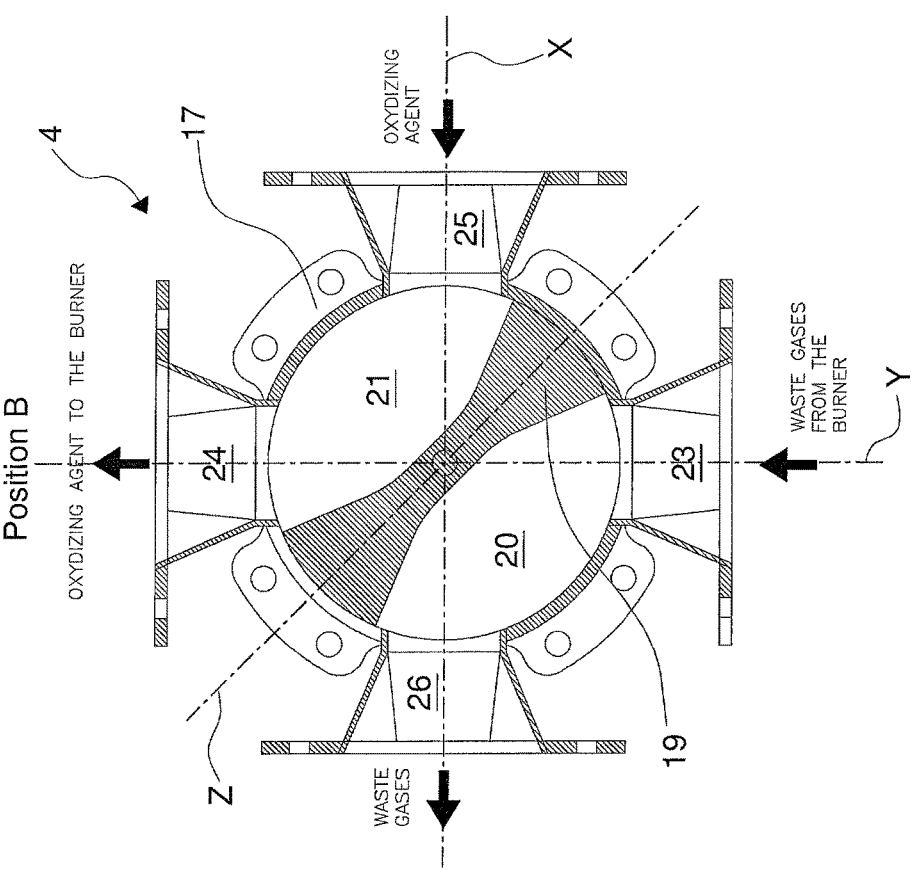

The switching valve 4 with four ways and three positions comprises a valve body 17 provided with:

two chambers 20, 21 divided by a mobile element 19, called shutter, which can occupy three positions, determining respective different positions of the chambers 20, 21;

way or pipe 25 for the inlet of the oxydizing agent into chamber 21 of the valve body 17, said pipe 25 being connected to the delivery pipe 15 of the oxidizing agent;

way or pipe 23 for introducing the oxydizing agent from chamber 21 into the pipe 13 of connection to chamber 3' of the regeneration body 3 when shutter 19 occupies a first position (FIG. 24a), or for introducing the combustion waste gases, coming from burner 2 and from chamber 3', into chamber 20 of the valve body 17 when shutter 19 occupies a second position (FIG. 24b);

way or pipe 26 for the discharge of the combustion waste gases, that arrive into chamber 20 of the valve body 17, into the waste gas return pipe 16;

way or pipe 24 for introducing the combustion waste gases, coming from burner 2 and from chamber 3', into chamber 20 of the valve body 17 when shutter 19 occupies the above first position (FIG. 24a), or for introducing the oxydizing agent from chamber 21 into the pipe 14 of connection to chamber 3" of the regeneration body 3 when shutter 19 occupies the above second position (FIG. 24b).

On the other hand, shutter 19 has such a shape that when it occupies a third position (FIG. 24c), it completely closes pipes 23 and 24 and thereby any connection between the switching valve 4 and the regeneration body 3. In this way, the oxydizing agent delivery to the regeneration body 3 and the combustion waste gas return from said regeneration body 3 are completely interrupted. Considering an imaginary axis X passing by the center of pipe 25 and by the center of pipe 26 and which divides the switching valve 4 into two portions, an imaginary axis Y passing by the center of pipe 23 and by the center of pipe 24 and which divides the switching valve into two further portions, and an imaginary axis Z integral with shutter 19 and which divides it into two longitudinal portions, it is possible to define:

the first position of the switching valve 4 with axis Z at −45° with respect to axis X and at +45° with respect to axis y (FIG. 24a);

the second position of the switching valve 4 with axis Z at +45° with respect to axis X and at −45° with respect to axis Y (FIG. 24b);

the third position of the switching valve 4 with axis Z at 90° with respect to axis X and parallel to axis Y (FIG. 24c).

The operating process of the system of the invention may be defined according to the position of shutter 19 of the switching valve 4 which physically moves the two chambers 20, 21 inside the switching valve 4 inverting the functions of the connection pipes 13, 14 with the regeneration body 3.

For more clarity, two reciprocally parallel paths are provided into the self-regenerative combustion system of the invention.

The first path comprises: chamber 20 or chamber 21 of the switching valve 4; the connection pipe 13 between valve 4 and regeneration body 3; the lower zone 29, the regeneration bed 11 and the upper zone 31 of chamber 3' of the regeneration body; chamber 38 of the connection pipe 9 between regeneration body 3 and burner 2; chamber 41 of burner 2; holes 61 of diffuser 5 of burner 2.

On the other hand, the second path comprises: chamber 21 or chamber 20 of the switching valve 4; the connection pipe 14 between valve 4 and regeneration body 3; the lower zone 30, the regeneration bed 12 and the upper zone 32 of chamber 3" of the regeneration body; chamber 39 of pipe 9; chamber 42 of burner 2; holes 48 of diffuser 5 of burner 2.

In a first preferred embodiment of the invention, shown in FIGS. 6 to 17, the hollow body 7 of burner 2 is provided with three chambers 41, 42 and 45.

Figure 15:
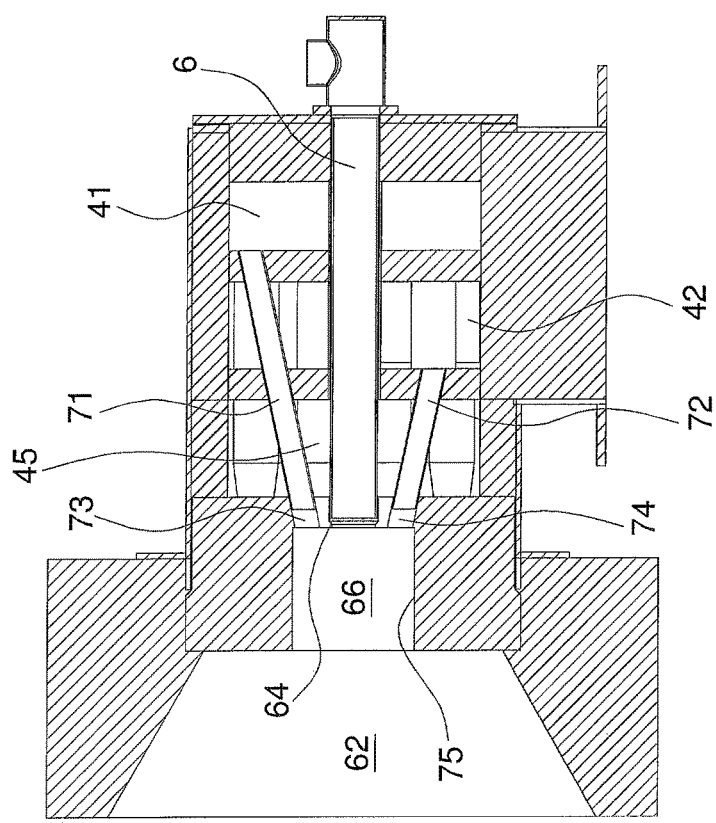
FIG. 15 shows a sectional view along a first plane of a second component of the system in FIG. 14.
Figure 13:
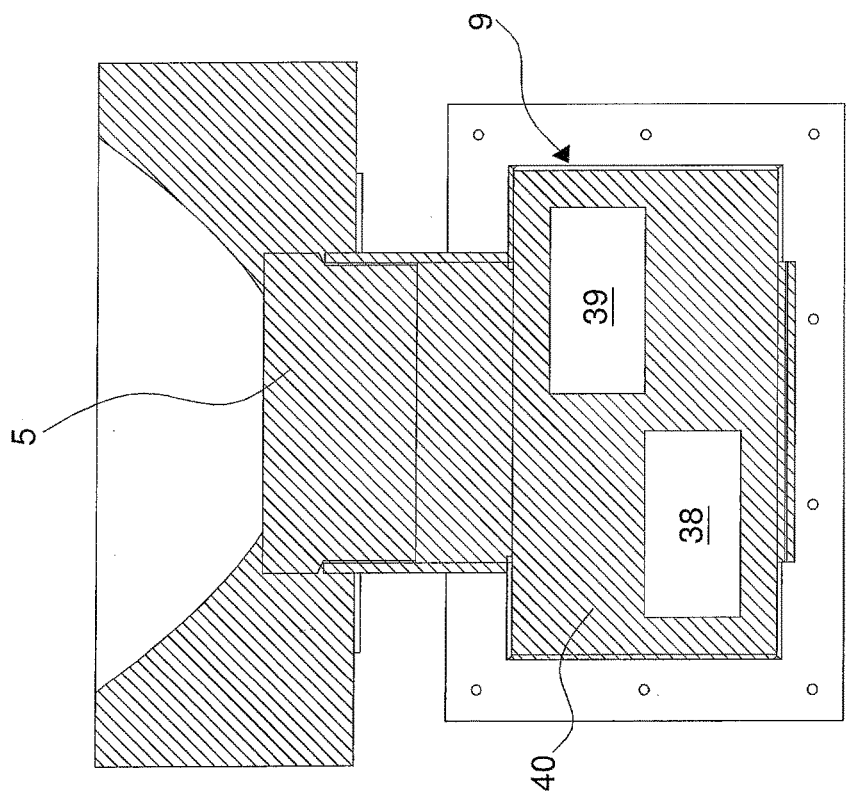
FIG. 13 shows a sectional view along a horizontal plane of further components of the system of the invention.
Figure 14:
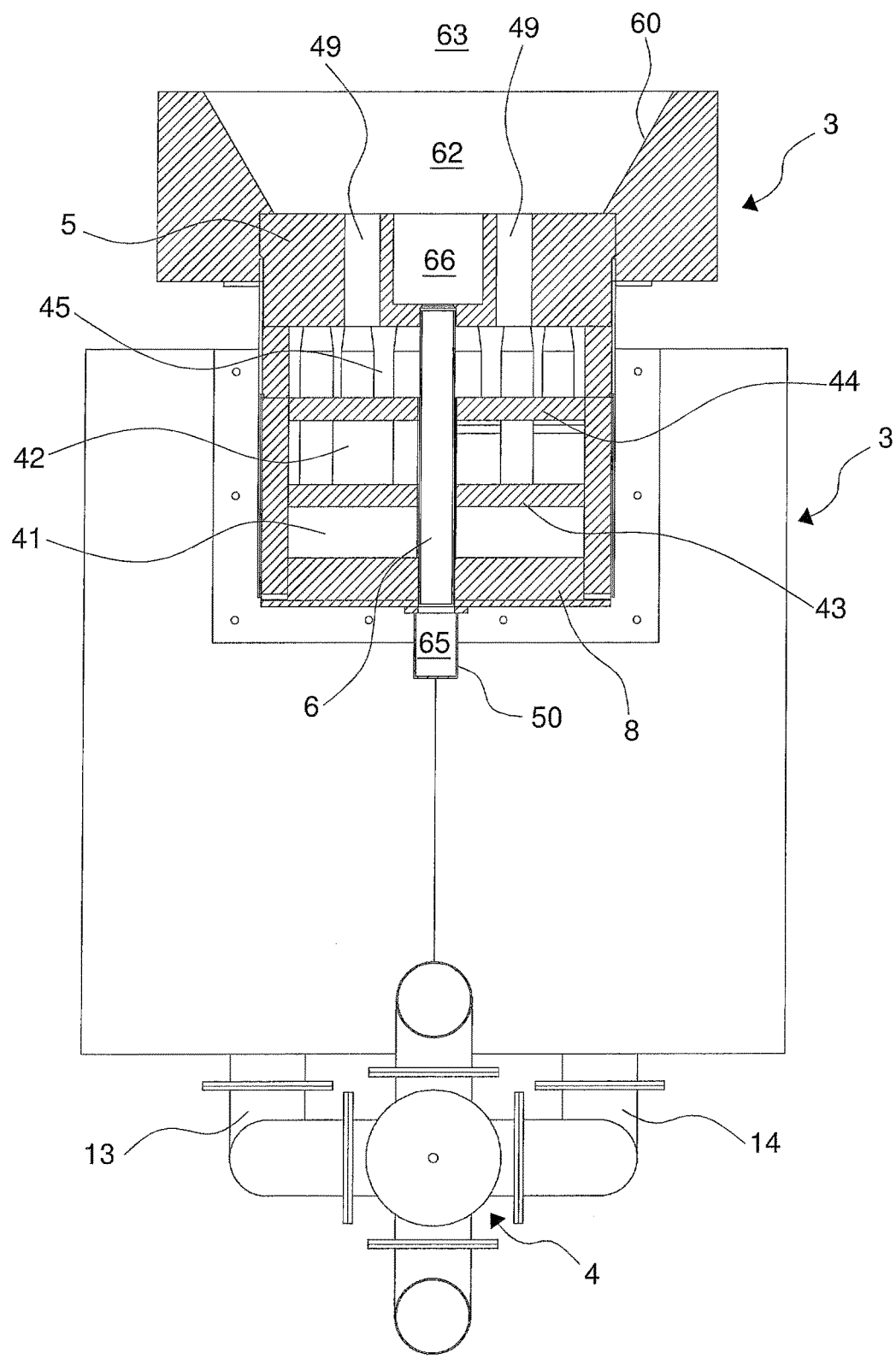
FIG. 14 shows a partially sectional view along a horizontal plane of a first embodiment of the system of the invention.
Figure 16:
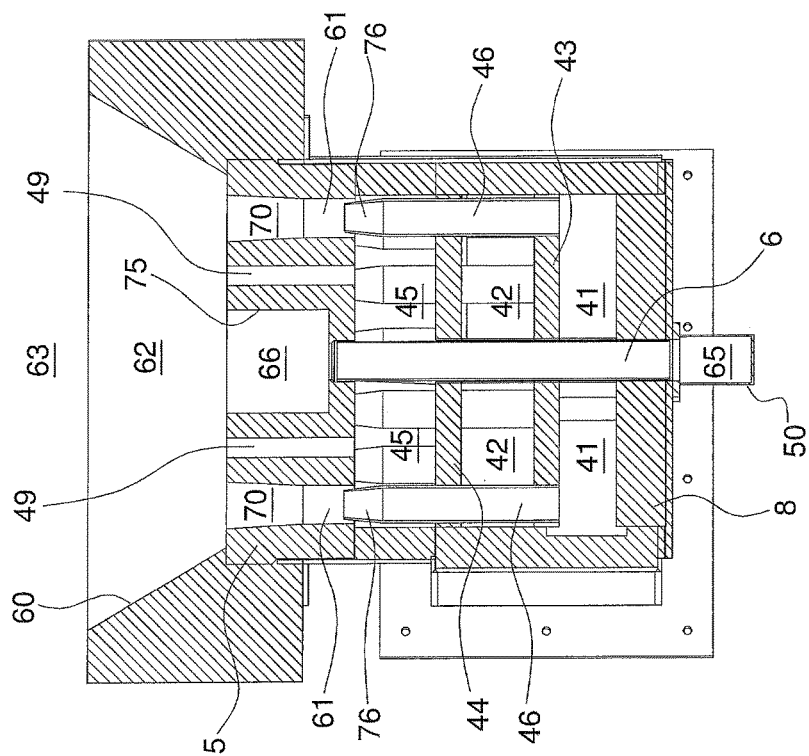
FIG. 16 shows a sectional view along a second plane of the second component of the system in FIG. 14.
Figure 18:
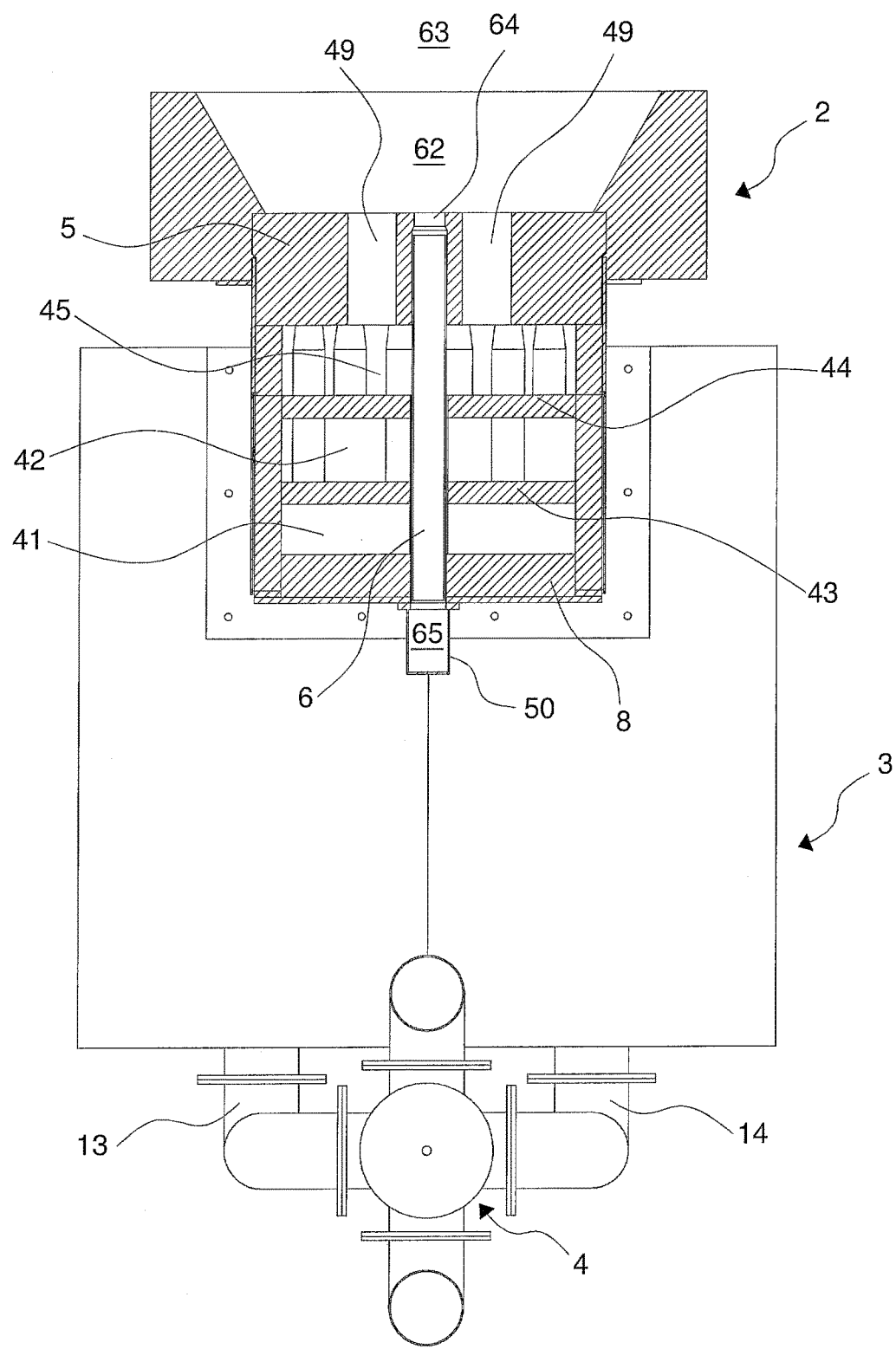
FIG. 18 shows a partially sectional view along a horizontal plane of a second embodiment of the system of the invention.
Figure 19:
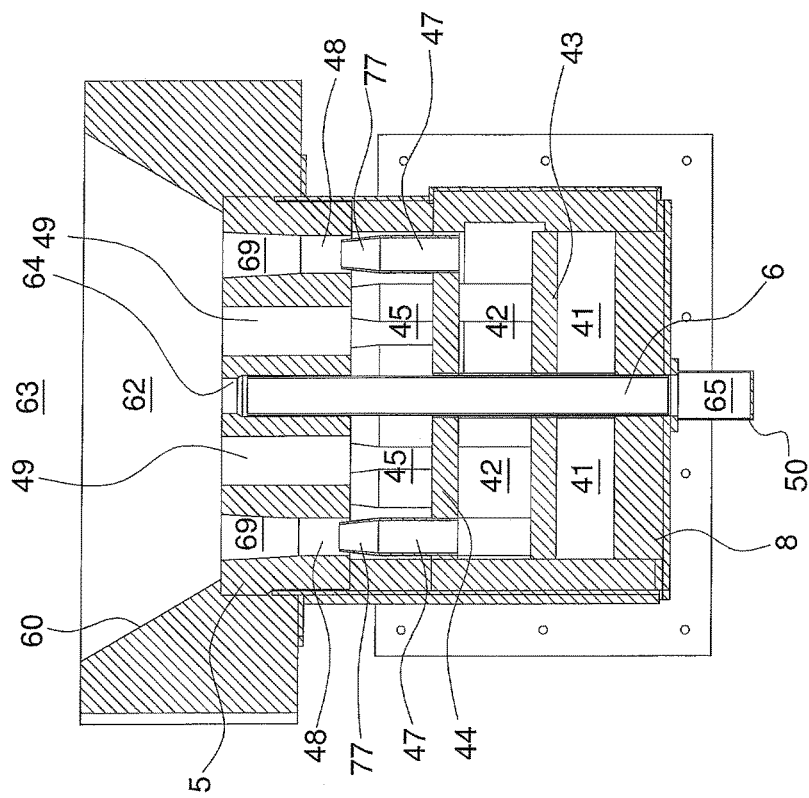
FIG. 19 shows a sectional view along a first plane of a second component of the system in FIG. 18.
Figure 20:
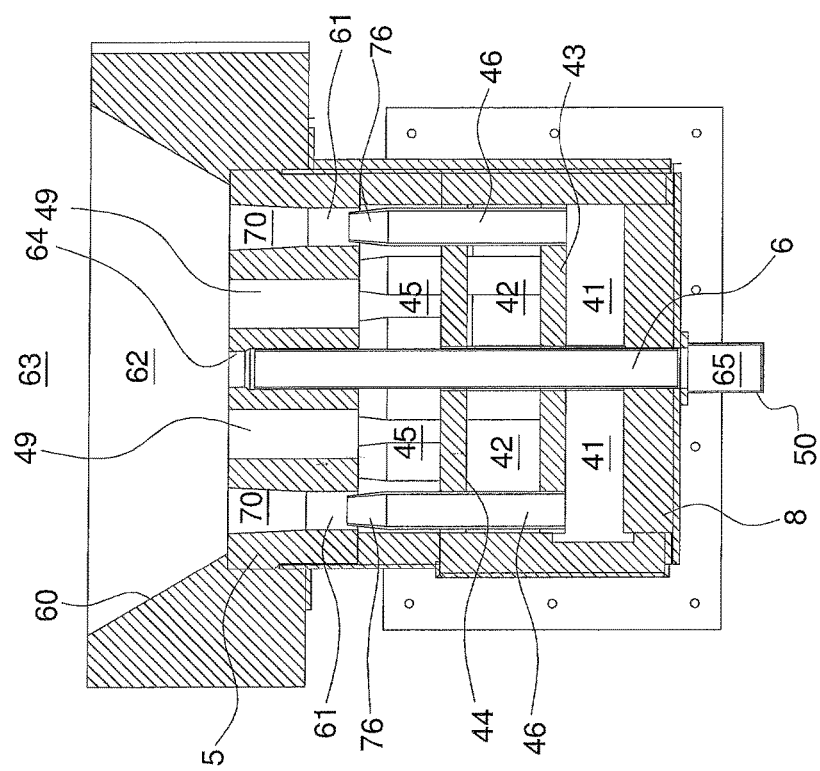
FIG. 20 shows a sectional view along a second plane of the second component of the system in FIG. 18.

Chamber 41 is arranged in the proximity of cover 8 and is delimited by said cover 8, by the inner surface of the hollow body 7, thermally insulated therein, and by an intermediate wall 43, of refractory material, parallel to cover 8. Said chamber 41 communicates on one end with chamber 38 of pipe 9 through hole 36 provided in the top wall 34, and on the other end it communicates with at least one hole 73, provided in diffuser 5, through at least one pipe 71 (FIG. 15) and with holes 61, provided on diffuser 5, through pipes 46 (FIG. 16).

Figure 17:
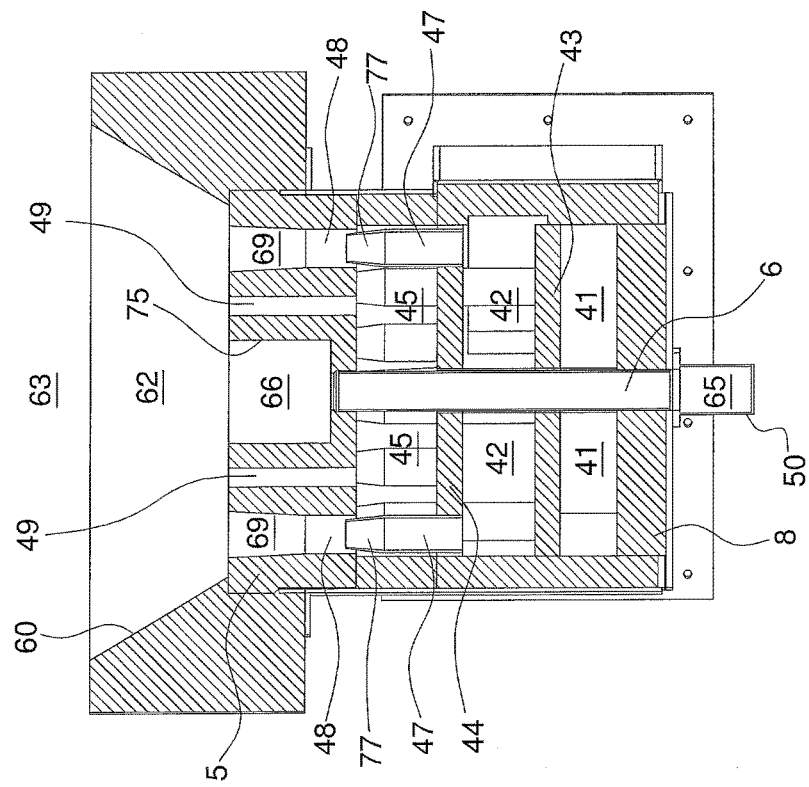
FIG. 17 shows a sectional view along a third plane of the second component of the system in FIG. 14.

Chamber 42 is the intermediate chamber between chamber 41 and chamber 45 and is delimited by the intermediate wall 43, by the inner surface of the hollow body 7 and by a further intermediate wall 44, of refractory material, parallel to wall 43. Said chamber 42 communicates on one end with chamber 39 of pipe 9 through hole 37 provided in the top wall 34, and on the other end it communicates with at least one hole 74, provided in diffuser 5, through at least one pipe 72 (FIG. 15) and with holes 48, provided on diffuser 5, through pipes 47 (FIG. 17). Pipes 71, 72 and pipes 46, 47 have a cylindrical shape and are made of a material resistant to high temperatures, for example silicon carbide.

Pipes 71, preferably in a number between 1 and 2, cross the intermediate walls 43, 44 and chambers 42, 45 slantwise and may have a diameter smaller than the diameter of the corresponding holes 73 of diffuser 5, in this case defining a passage crown or section.

Pipes 72, preferably in a number between 1 and 2, cross the intermediate wall 44 and chamber 45 slantwise and may have a diameter smaller than the diameter of the corresponding holes 74 of diffuser 5, in this case defining a passage crown or section.

Pipes 46, in a number between 2 and 8, preferably between 4 and 6, cross the intermediate walls 43, 44 and chambers 42, 45 and may be provided, at the end thereof distal from chamber 41, with a converging segment 76 partially inserted into the corresponding hole 61 of diffuser 5, in this case being able to define a passage crown or section.

Pipes 47, in a number between 2 and 8, preferably between 4 and 6, cross the intermediate wall 44 and chamber 45 and may be provided, at the end thereof distal from chamber 42, with a converging segment 77 partially inserted into the corresponding hole 48 of diffuser 5, in this case being able to define a passage crown or section.

Said passage crowns or sections are therefore internally defined by the end part of pipes 46, 47, 71, 72 and externally defined by the respective holes 61, 48, 73, 74. Chamber 45 is arranged in the proximity of diffuser 5 and is delimited by said diffuser 5, by the inner surface of the hollow body 7 and by the intermediate wall 44, also parallel to the diffuser. Said chamber 45 directly communicates with at least two holes 49, provided in diffuser 5, and also with holes 61, 48, 73, 74 if the above passage crowns or sections are provided (FIGS. 15 to 17). The function of holes 49 and of the passage crowns or sections is to allow a combustion waste gas recirculation inside chamber 45 during the system operation in positions A and B of shutter 19 of the switching valve 4 shown in FIGS. 24a and 24b.

In this first embodiment the diffuser 5, preferably but not necessarily made of refractory material, is provided with a central cavity 75, defining a primary combustion area 66, and is provided with the following holes:

at least one hole 73 which puts the respective pipe 71, and thus chamber 41 of the burner, into communication with the primary combustion area 66;

at least one hole 74 which puts the respective pipe 72, and thus chamber 42 of the burner, into communication with the primary combustion area 66;

holes 61 which put the respective pipes 46, and thus chamber 41, into communication with the secondary combustion area 62;

holes 48 which put the respective pipes 47, and thus chamber 42, into communication with the secondary combustion area 62;

a central hole 64, arranged along the axis of the diffuser, which puts the fuel introduction lance 6 into communication with the primary combustion area 66, the lance 6 being coaxial to said central hole 64 and partially fitted into the hole 64;

at least two holes 49 which put chamber 45 of the burner into communication with the combustion areas 62, 66.

Advantageously, holes 61 and 48 for injecting the oxydizing agent or aspiring the waste gases have the front ends, i.e. those arranged towards the secondary combustion area 62, positioned along an ellipse having the center on the longitudinal axis H of burner 2. Such advantageous arrangement allows a diluted secondary combustion to be carried out thanks to the fact that the mixing between the fuel, injected in the combustion chamber by lance 6, and the oxidizing agent, injected through holes 61 or 48, takes place at different distances from diffuser 5. This is due to the fact that the distance of holes 61, 48 from the longitudinal axis of the burner, coincident with the fuel injection direction, is not constant. The combustion is therefore diluted and the combustion reaction between oxydizing agent and fuel is carried out gradually as the distance from the diffuser increases. This leads to a further reduction of NOx emissions.

The number, shape, possible inclination with respect to the longitudinal axis of the burner and arrangement of holes 61 are the same as those of holes 48. The arrangement of holes 61 and 48 on the ellipse may be alternating: 1 by 1, 2 by 2, 3 by 3, 4 by 4, 5 by 5, 6 by 6, 7 by 7, 8 by 8. Preferably, the arrangement is 1 by 1 (FIG. 6) to better use the internal recirculation of the waste gases aspired by the diffuser.

Optionally, holes 61, 48 have a first cylindrical segment, in the proximity of the interior of the burner, and a second frustoconical segment 70, 69 in the proximity of the secondary combustion area 62. In particular, such second frustoconical segment 70, 69 diverges in the direction towards said area 62. This technical solution favors the ejection effect of the oxidizing agent, reducing load losses downstream of the mixing zone, and accordingly it implies a higher aspiration of the combustion waste gases.

Advantageously, holes 73 and 74 for injecting the oxydizing agent or drawing the waste gases have the front ends arranged towards the primary combustion area 66. Such front ends are preferably positioned along at least one plane containing the major axis or the minor axis of said ellipse. For example in FIG. 6, holes 73 and 74 are two in total and are arranged along a plane containing the minor axis of said ellipse, above and below the central hole 64, respectively.

In the case of two holes 73 and two holes 74, the front ends of a first pair of holes 73, 74 are arranged along the plane containing the major axis, whereas the front ends of a second pair of holes 73, 74 are arranged along the plane containing the minor axis of the ellipse.

The number and inclination, with respect to the longitudinal axis of the burner, of holes 73 are the same as holes 74.

Advantageously, holes 49 for recirculating the waste gases into chamber 45 have front ends positioned along the major axis of said ellipse. For example, in FIG. 6 holes 49 are two, arranged at the sides of cavity 75, respectively.

Considering this first embodiment of the invention, the combustion chamber of the furnace is formed by the primary combustion area 66, the secondary combustion area 62 and the remaining area 63 downstream of area 62.

In particular, in order to further reduce the NOx emissions, the secondary combustion area 62 is delimited, in addition to diffuser 5 and area 63, by a diverging flaring 60 which diverges towards area 63. Such flaring 60 is intended to promote the waste gas recirculation within such secondary combustion area 62 so as to reduce the NOx.

Below is a description of the steady state operation of said first embodiment of the self-regenerative combustion system of the invention, wherein the process steps alternate by means of the movement of shutter 19 within the switching valve 4, from position A to position B (FIGS. 24a, 24b). This continuous movement of shutter 19, at predetermined intervals of time, from position A to position B and vice versa, allows the continuous optimization of the oxydizing agent preheating using at the maximum the heat of the combustion waste gases alternately transferred to one of the two regeneration beds 11, 12 of the regeneration body or simply, regenerator 3.

When it is necessary to shut down the combustion system, shutter 19 will be moved to position C (FIG. 26c). In order to execute the process according to the invention there are provided means for processing and controlling the process, built in the system, for controlling shutter 19 of the switching valve 4 and also for controlling the switching valve on the fuel delivery pipe.

Position A (FIG. 24a)
Step 1—Position A

The oxidizing agent, coming from the delivery pipe 15, enters the switching valve 4 and crosses pipe 25 or "first way" of the valve. The oxydizing agent crosses chamber 21, delimited by the valve body 17 and by shutter 19. The oxydizing agent is directed into pipe 23 or "second way" of the valve and is delivered to regenerator 3 through pipe 13. The oxydizing agent enters regenerator 3 at room temperature through hole 27 and fills the lower space 29 of chamber 3'. The oxydizing agent is preheated passing through the regeneration bed 11 at high temperature (preheated in the previous step, not yet described, by the passage of the combustion waste gases), exits from the regeneration bed 11 and fills the upper space 31 of chamber 3'. The preheated oxydizing agent therefore passes from chamber 3', through hole 36 of the top wall 34, into chamber 38 of pipe 9 communicating with chamber 41 inside burner 2. Once filled the volume of chamber 41, the oxydizing agent passes through pipes 71 and pipes 46 to arrive into holes 73 and holes 61 of diffuser 5, respectively. A part of the oxidizing agent, called primary oxidizing agent, enters into pipes 71, passes through holes 73 and leads into the primary combustion area 66. Another part of the oxidizing agent, called secondary oxidizing agent, enters into pipes 46, passes through holes 61 and leads into the secondary combustion area 62, downstream of area 66.

At the same time the fuel, coming from the respective delivery pipe (not shown) independently of the switching valve 4, fills volume 65 inside pipe 50 and is introduced into the introduction lance 6 inside burner 2. Passing through lance 6 and through the central hole 64 of diffuser 5, the fuel leads into the primary combustion area 66. The fuel mixes with the primary oxydizing agent into area 66 producing a first part of the combustion, called primary combustion, which takes place in excess of fuel. The combustion reaction is completed in area 62, adjacent area 66, through the excess fuel from the primary combustion, the secondary oxydizing agent and the waste gases produced by the primary combustion reaction. Such secondary combustion takes place in excess of oxidizing agent.

In this step, pipes 71 and holes 73 may be defined as "primary" as they contribute to the primary combustion, whereas pipes 46 and holes 61 may be defined as "secondary" as they contribute to the secondary combustion.

Such combustion technique (air staging) reduces the flame temperature and the NOx emissions which are further reduced also thanks to an internal recirculation of a part of the combustion waste gases, promoted by the ejection effect of the oxidizing agent, which creates a vacuum that affects chamber 45, wherein the waste gases are aspired and then pulled by the oxydizing agent passing into pipes 46 and 71 towards holes 61 and 73 of diffuser 5. The recirculation effect is intended to make the oxydizing agent enter into the combustion chamber with a percentage of oxygen lower than the original one (about 21%).

Step 2—Position A

At the same time as step 1), a part of the combustion waste gases produced by the combustion reaction described above is absorbed by the system of the invention as described hereinafter.

The combustion waste gases at high temperature pass through holes 74 and 48 of diffuser 5, having the same geometry as holes 73 and 61 respectively, and enter into pipes 72 and 47. The waste gases full chamber 42 inside burner 2 and pass into chamber 39 of the pipe. Entering into regenerator 3 through hole 37 of the top wall 34 of regenerator 3, the waste gases fill the upper volume 32 of chamber 3". Once the upper volume 32 has been filled, the waste gases cool down passing through the regeneration bed 12 at low temperature (cooled in the previous step, not yet described, by the passage of the oxydizing agent at room temperature). Once passed through the regeneration bed 12, the cooled waste gases fill the lower volume 30 of chamber 3". The cooled waste gases then pass through hole 28 and enter into pipe 14 up to arrive into pipe 24 or "third way" of the switching valve 4. The cooled waste gases therefore lead into chamber 20, delimited by the valve body 17 and by shutter 19, are directed into pipe 26 or "fourth way" of the valve and are delivered into the waste gas return pipe 16 which connects the system of the invention to the plant.

Position B (FIG. 24b)

Step 1—Position B

The oxidizing agent, coming from the delivery pipe 15, enters the switching valve 4 and crosses pipe 25 or "first way" of the valve. The oxydizing agent crosses chamber 21, delimited by the valve body 17 and by shutter 19. The oxydizing agent is directed into pipe 24 or "third way" of the valve and is delivered to regenerator 3 through pipe 14. The oxydizing agent enters regenerator 3 at room temperature through hole 28 and fills the lower space 30 of chamber 3". The oxydizing agent is preheated passing through the regeneration bed 12 at high temperature (preheated by the passage of the combustion waste gases in the previous step 2 related to position A of the switching valve 4), exits from the regeneration bed 12 and fills the upper space 32 of chamber 3". The preheated oxydizing agent therefore passes from chamber 3", through hole 37 of the top wall 34, into chamber 39 of pipe 9 communicating with chamber 42 inside burner 2.

Once filled the volume of chamber 42, the oxydizing agent passes through pipes 72 and pipes 47 to arrive into holes 74 and holes 48 of diffuser 5, respectively. A part of the oxidizing agent, called primary oxidizing agent, enters into pipes 72, passes through holes 74 and leads into the primary combustion area 66. Another part of the oxidizing agent, called secondary oxidizing agent, enters into pipes 47, passes through holes 48 and leads into the secondary combustion area 62, downstream of area 66. At the same time the fuel, coming from the respective delivery pipe (not shown) independently of the switching valve 4, fills volume 65 inside pipe 50 and is introduced into the introduction lance 6 inside burner 2. Passing through lance 6 and through the central hole 64 of diffuser 5, the fuel leads into the primary combustion area 66. The fuel mixes with the primary oxydizing agent into area 66 producing a first part of the combustion, called primary combustion, which takes place in excess of fuel. The combustion reaction is completed in area 62, adjacent area 66, through the excess fuel from the primary combustion, the secondary oxydizing agent and the waste gases produced by the primary combustion reaction. Such secondary combustion takes place in excess of oxidizing agent.

In this step, pipes 72 and holes 74 may be defined as "primary" as they contribute to the primary combustion, whereas pipes 47 and holes 48 may be defined as "secondary" as they contribute to the secondary combustion.

Such combustion technique (air staging) reduces the flame temperature and the NOx emissions which are further reduced also thanks to an internal recirculation of a part of the combustion waste gases, promoted by the ejection effect of the oxidizing agent, which creates a vacuum that affects chamber 45, wherein the waste gases are aspired and then pulled by the oxydizing agent passing into pipes 47 and 72 towards holes 48 and 74 of diffuser 5. The recirculation effect is intended to make the oxydizing agent enter into the combustion chamber with a percentage of oxygen lower than the original one (about 21%).

Step 2—Position B

At the same time as step 1), a part of the combustion waste gases produced by the combustion reaction described above is absorbed by the system of the invention as described hereinafter.

The combustion waste gases at high temperature pass through holes 73 and 61 of diffuser 5 and enter into pipes 71 and 46. The waste gases fill chamber 41 inside burner 2 and pass into chamber 38 of pipe 9. Entering into regenerator 3 through hole 36 of the top wall 34, the waste gases fill the upper volume 31 of chamber 3'. Once the upper volume 31 has been filled, the waste gases cool down passing through the regeneration bed 11 at low temperature (cooled by the passage of the oxydizing agent at room temperature in the previous step 1 related to position A of the switching valve 4). Once passed through the regeneration bed 11, the cooled waste gases fill the lower volume 29 of chamber 3'. The cooled waste gases then pass through hole 27 and enter into pipe 13 up to arrive into pipe 23 or "second way" of the switching valve 4. The cooled waste gases therefore lead into chamber 20, are directed into pipe 26 or "fourth way" of the valve and are delivered into the waste gas return pipe 16 which connects the system of the invention to the plant.

Position C (FIG. 24c)

When it is necessary to shut down the combustion system, shutter 19 will be moved to position C.

The oxidizing agent, coming from the delivery pipe 15, enters the switching valve 4 crossing pipe 25 or "first way" of the valve. The oxydizing agent fills chamber 21, delimited by the valve body 17 and by shutter 19. Since shutter 19 closes both pipes 23, 24 (second and third way), the oxydizing agent cannot continue its travel towards regenerator 3 and burner 2 and is forced to stop into chamber 21 of valve 4. In fact, the delivery pipe 15 is not connected to any of the connection pipes 13, 14 between valve 4 and regenerator 3.

Also the aspired combustion waste gases, as described in step 2 related to position A and in step 2 related to position B, are stopped by the position of shutter 19 in position C. Therefore, the vacuum induced to the self-regenerative combustion system by the waste gas aspiration device, external to said system, such as for example an exhauster connected to the waste gas return pipe 16, has no effect anymore since the return pipe 16 is not connected to any of the connection pipes 13, 14 between valve 4 and regenerator 3.

At the same time, the fuel is stopped by an on-off valve provided on the fuel delivery pipe (not shown) and therefore it does not fill volume 65 of pipe 50 anymore and does not continue its travel towards the combustion chamber.

By the effect of the actions mentioned above, no combustion reaction and no waste gas aspiration through the regenerative system 1 take place inside the combustion chamber.

A second embodiment of the combustion system of the invention is shown in FIGS. 8-13 and 18-21.

This second embodiment is identical to the first embodiment except in that the central cavity 75 is not provided in diffuser 5 and, thus, the primary combustion area 66 is not provided. In this case, the central hole 64 is made in the whole thickness of diffuser 5 and the fuel gas introduction lance 6, arranged along the longitudinal axis H of the burner, is partially and coaxially fitted into said hole 64 which directly puts it into communication with area 62 of the combustion chamber. In this case, the fuel gas is directed into the combustion chamber through diffuser 5 in zones 62 and 63. Therefore, pipes 71 and 72 inside the burner and holes 73 and 74 in diffuser 5 are not provided. This solution has the advantage of a higher construction simplicity and allows a further reduction of NOx emissions with the system operating at a temperature of the combustion chamber higher than the fuel self-ignition temperature.

With reference to the first and second embodiment of the invention, an internal recirculation of the combustion waste gases is advantageously provided thanks to the provision of chamber 45, inside burner 2, which is in communication with the combustion chamber through holes 49 and the passage crowns or sections internally defined by the end portion of pipes 46, 47, 71, 72 and externally defined by the respective holes 61, 48, 73, 74.

The function of holes 49 relates to a function of combustion waste gas recirculation inside said chamber 45 during the system operation with shutter 19 in positions A and B. In particular, the mixing of such recirculation waste gases takes place with the oxydizing agent entering into holes 73, 61 during step 1 related to position A of the shutter or with the oxydizing agent entering into holes 74, 48 during step 1 related to position B of the shutter.

The injection effect produced by the oxydizing agent has effect into chamber 45 so that combustion waste gases are sucked from the combustion chamber 62, 66, enter into holes 49, fill chamber 45 and mix with the oxidizing agent, entering into the combustion chamber, thanks to the passage crowns or sections defined by pipes 71, 46 and respective holes 73, 61 (position A) or thanks to the passage crowns or sections defined by pipes 72, 47 and respective holes 74, 48 (position B).

In other words, the combustion waste gas recirculation is promoted by the ejection effect of the oxidizing agent, which creates a vacuum that affects chamber 45, in which the waste gases are aspired and then pulled by the oxidizing agent passing into pipes 46, 47, 71, 72 towards holes 61, 48, 73, 74 of diffuser 5.

The recirculation effect is intended to make the oxydizing agent enter into the combustion chamber with an oxygen percentage lower than the original one (about 21%). The decrease of such percentage favors a reduction in the flame temperature produced by the burner, with the consequent reduction of NOx emissions produced by the combustion.

The combustion waste gas recirculation is advantageously defined according to the following factors:

- the ratio between diameter of holes 49 and diameter of holes 48 or 61 is less than or equal to 2.5 to maximize the recirculation effect, preferably in the range from 1.25 to 1.8;
- the number of holes 49 is in the range from 2 to 4 to maximize the recirculation effect, preferably equal to 2;
- pipes 71, 72, 46, 47 are coaxial to the respective holes 73, 74, 61, 48 of diffuser 5,
- the ratio of the end passage section of pipes 71 and 72 with the diameter of holes 73 and 74, respectively, is less than or equal to 0.8 to maximize the recirculation effect, preferably in the range from 0.66 to 0.71;
- the ratio of the end passage section of the converging segment 76 of pipes 46 with the diameter of holes 61 is less than or equal to 0.8 to maximize the recirculation effect, preferably in the range from 0.66 to 0.71;
- the ratio of the end passage section of the converging segment 77 of pipes 47 with the diameter of holes 48 is less than or equal to 0.8 to maximize the recirculation effect, preferably in the range from 0.66 to 0.71;
- the speed of the oxydizing agent into pipes 71, 72 is in the range 80-140 m/s to maximize the recirculation effect. Preferably, such speed is 90-110 m/s;
- the speed of the oxydizing agent in the converging segments 76, 77 of pipes 46, 47 is in the range 80-140 m/s to maximize the recirculation effect. Preferably, such speed is 90-120 m/s;
- the ratio of the length of the frustoconical segment 69, 70 of the respective holes 48, 61 and the length of the cylindrical segments of the holes 48, 61 is less than or equal to 1.5 to maximize the recirculation effect. Preferably, the ratio of such lengths is 1;

the angle of the frustoconical segment 69, 70 of the respective holes 48, 61 with respect to the axis of said holes is less than or equal to 5° to maximize the recirculation effect.

The quantity of waste gases absorbed into chamber 45 and recirculated by the single pipe 46 or 47 inside the respective holes 61 or 48 is less than or equal to 30% with respect to the oxydizing agent passing into pipe 46 or 47. With a quantity of waste gases equal to 30%, the recirculation effect is maximized.

Figure 22:
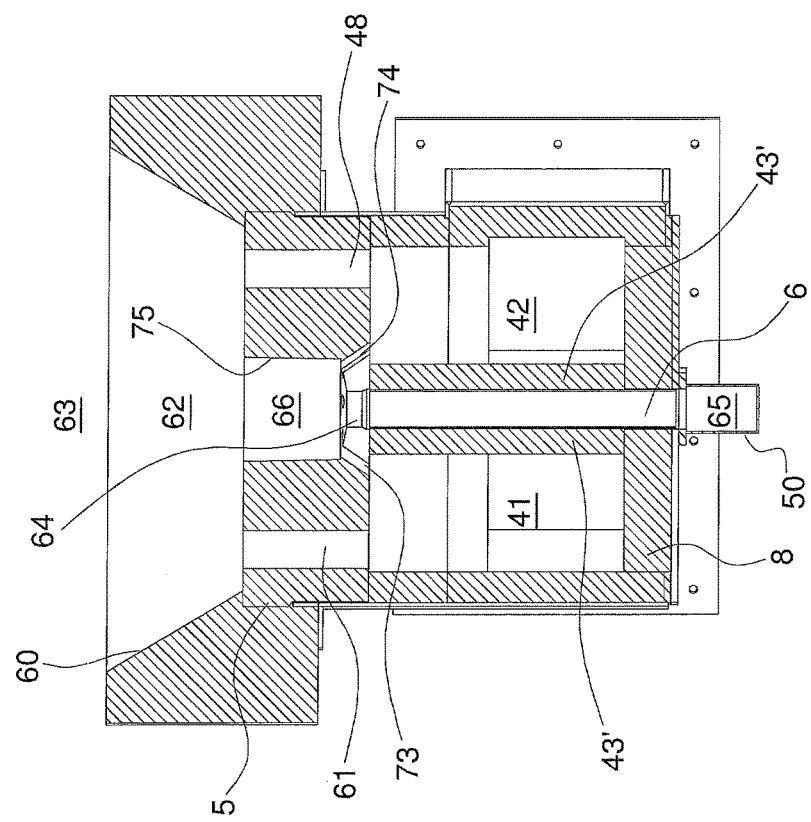
FIG. 22 shows a sectional view along a second plane of the second component of said third embodiment of the invention.
Figure 21:
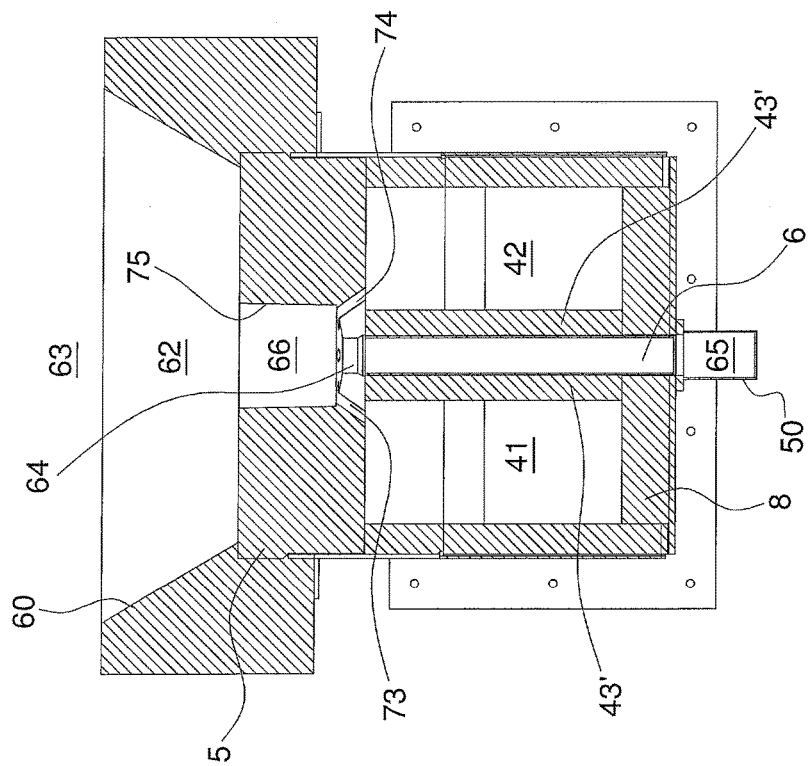
FIG. 21 shows a sectional view along a first plane of a second component of said third embodiment of the invention.

A third embodiment of the combustion system of the invention is shown in FIGS. 21 and 22, wherein the waste gas recirculation chamber 45 into burner 2 is not provided.

This third embodiment is identical to the previous embodiments except for the configuration of burner 2.

Advantageously, the hollow body 7 of burner 2 is provided with only two chambers 41, 42, reciprocally separated by an intermediate wall 43' of refractory material, longitudinally positioned with respect to burner 2. The fuel gas introduction lance 6 is provided inside wall 43. Chamber 41 serves for feeding the oxydizing agent to diffuser 5 and chamber 42 serves for aspiring the combustion waste gases, or vice versa according to the operating step of the system of the invention.

Chamber 41 is delimited by the inner surface of the hollow body 7 of the burner, coated with a refractory material, by a first part of diffuser 5, by a first part of cover 8 of the burner, also made of refractory material, and by wall 43' of refractory material.

Said chamber 41, wherein the oxydizing agent and the combustion waste gases flow alternately, communicates on one end with chamber 38 of pipe 9 through hole 36 provided in the top wall 34, and on the other end it directly communicates with at least one hole 73, provided in diffuser 5 and which leads into the primary combustion area 66 (FIG. 21) and directly with holes 61, provided on diffuser 5 and which lead into the secondary combustion area 62 (FIG. 22).

On the other hand, chamber 42 is delimited by the inner surface of the hollow body 7, by a second part of diffuser 5, by a second part of cover 8 of the burner and by wall 43'.

Said chamber 42, wherein the combustion waste gases and the oxydizing agent flow alternately, communicates on one end with chamber 39 of pipe 9 through hole 37 provided in the top wall 34, and on the other end it directly communicates with at least one hole 74, provided in diffuser 5 and which leads into the primary combustion area 66 (FIG. 21), and directly with holes 48, provided on diffuser 5 and which lead into the secondary combustion area 62 (FIG. 22).

Chambers 41 and 42 are therefore arranged parallel to each other and to the fuel introduction lance 6.

In this third embodiment, simpler from the structural point of view, the waste gas recirculation is not feasible since chamber 45 and pipes 71, 72, 46, 47, wherethrough the ejection process required to recirculate the waste gases took place, are not provided anymore. Accordingly, the waste gas recirculation holes 49 are not provided in diffuser 5 anymore.

Holes 73 and 74 are arranged into cavity 75 of diffuser 5 as in the previous embodiments.

Likewise, holes 61 and 48 for injecting the oxydizing agent or aspiring the waste gases have the front ends, i.e. those arranged towards the secondary combustion area 62, positioned along an ellipse having the center on the longitudinal axis of burner 2. Such advantageous arrangement allows a diluted secondary combustion to be carried out thanks to the fact that the mixing between the fuel, injected in the combustion chamber by lance 6, and the oxidizing agent, injected through holes 61 or 48, takes place at different distances from diffuser 5. This leads to a further reduction of NOx emissions.

The number, shape and any inclination with respect to the longitudinal axis of the burner and the arrangement of holes 61 are the same as holes 48.

The arrangement of holes 61 and 48 on the ellipse cannot be alternating as in the previous embodiments. In this case, holes 61 will all be adjacent and arranged along a semi-ellipse, in a first part of the diffuser. The same arrangement is provided for holes 48 in a second part of the diffuser.

Optionally, holes 61, 48 have a first cylindrical segment in proximity of the interior of the burner, and a second frustoconical segment in proximity of the secondary combustion area 62. In particular, such second frustoconical segment diverges in the direction towards said area 62. This technical solution favors the ejection effect of the oxidizing agent, reducing load losses downstream of the mixing zone, and accordingly it implies a higher aspiration of the combustion waste gases.

The speed of the oxydizing agent in holes 73 or 74 and the speed of the oxydizing agent in holes 61 or 48 is in the range 60-120 m/s if the burner operates at chamber temperatures lower than the self-ignition one.

Finally, a fourth embodiment (not shown) is identical to the third embodiment except in that the central cavity 75 is not provided in diffuser 5 and thus, the primary combustion area 66 is not provided. In this case, the central hole 64 is made in the whole thickness of diffuser 5 and the fuel gas introduction lance 6, arranged along the central longitudinal axis H of the burner, is partially and coaxially fitted into said hole 64 which directly puts it into communication with area 62 of the combustion chamber. In this case, the fuel gas is directed into the combustion chamber through diffuser 5 in zones 62 and 63. Therefore, holes 73 and 74 in diffuser 5 are not provided. This solution has the advantage of a higher construction simplicity and allows a further reduction of NOx emissions with the system operating at a temperature of the combustion chamber higher than the fuel self-ignition temperature.

Below are some parameters of the combustion process which ensure an effective combustion, and some design data of the burner according to the present invention:

- the primary oxydizing agent percentage may range from 0 to 30%. If the burner operates below the fuel self-ignition temperature, the primary oxydizing agent (air) percentage preferably is 30%, otherwise it preferably is 0%;
- the secondary oxydizing agent percentage may range from 70 to 100%. If the burner operates below the fuel self-ignition temperature, the secondary oxydizing agent (air) percentage preferably is 70%, otherwise it preferably is 100%;
- the ratio between the diameter of cavity 75, which delimits the primary combustion area 66, and the diameter of lance 6 is in the range from 0 to 5; if the burner operates below the fuel self-ignition temperature, the ratio is in the range from 4 to 5, otherwise it is 0;
- the number of holes 73 may range from 0 to 2; if the burner operates below the fuel self-ignition temperature, the number is 1 or 2, otherwise it is 0;
- the number of holes 74 may range from 0 to 2; if the burner operates below the fuel self-ignition temperature, the number is 1 or 2, otherwise it is 0;
- the inclination of holes 73 with respect to the longitudinal axis H of the burner may range from 0 to +30°, preferably the inclination is 25°;

the inclination of holes 74 with respect to the longitudinal axis H of the burner may range from 0 to +30°, preferably the inclination is 25°;

the number and inclination of holes 73 are the same as holes 74;

the number of holes 61 may range from 2 to 8, preferably from 4 to 6;

the inclination of holes 61 with respect to the longitudinal axis H of the burner may range from −10 to +10°, preferably the inclination is 0°;

the number of holes 48 may range from 2 to 8, preferably from 4 to 6;

the inclination of holes 48 with respect to the longitudinal axis H of the burner may range from −10 to +10°, preferably the inclination is 0°;

the number, shape, inclination and arrangement of holes 61 are the same as holes 48;

the transversal section of diffuser 5 and of the body of burner 2 is substantially shaped as an ellipse;

the ratio of the minor and the major half-axis of the ellipse, whereon holes 48, 61 are arranged, is in the range from 0.5 to 0.9, preferably from 0.65 to 0.75;

the speed of the oxydizing agent into holes 48, 61 is in the range from 30 to 180 m/s, preferably from 70 to 130 m/s;

the speed of the fuel in hole 64 is in the range from 20 to 200 m/s; if the burner operates below the fuel self-ignition temperature, the speed is in the range from 20 to 30 m/s, otherwise it is in the range from 100 to 200 m/s;

the inclination of the flared surface 60 with respect to the longitudinal axis H of the burner may range from 20 to 40°, preferably from 25° to 35°.

Below is a list of some advantageous details related to the self-regenerative combustion system of the invention:

the system requires a single oxydizing agent delivery pipe, a single combustion waste gas return pipe and a single fuel delivery pipe: simplified condition as compared to the current regeneration systems;

during the burner operating steps, the fuel injection is constantly active as it needs not be interrupted;

at least two chambers having the same volume separated by a wall of refractory material are provided inside the burner;

two chambers 38 and 39 having the same volume separated by a wall of refractory material are provided inside the connection pipe 9 between regenerator 3 and burner 2;

two regeneration beds having the same volume and shape, separated by a wall of refractory material, are provided inside regenerator 3;

in order to obtain the maximum heat exchange and the maximum efficiency of the regeneration beds, the ratio between the waste gas flow rate aspired by the self-regenerative system 1 and the flow rate of oxydizing agent injected is in the range from 0.7 to 1, preferably from 0.75 to 0.9;

the switching valve 4, combined with a three-position actuator, allows both the regeneration steps and the burner shutdown step to be carried out without requiring further on-off valves on the oxydizing agent end and on the waste gas end.

In all the embodiments of the invention, pipes 13 and 14 are to be deemed optional since the switching valve 4 may be directly connected to holes 27 and 28 of the lower volumes 29, 30 of chambers 3', 3" of the regeneration body 3.

The invention claimed is:

1. A self-regenerative combustion system comprising:

a single burner configured to introduce fuel in a combustion chamber and having a hollow body including at least two first chambers separated from each other and configured to respectively introduce oxydizing agent into said combustion chamber and receive, at the same time, combustion waste gases aspired from said combustion chamber, or vice versa;

a regeneration body connected to the burner and located outside the hollow body of the burner, the regeneration body including two second chambers separated from each other and configured respectively to preheat the oxydizing agent in its passage towards the burner and to recover heat from the combustion fumes coming from the burner, or vice versa; a first chamber of said two second chambers being in communication with a first chamber of the burner, and a second chamber of said second chambers being in communication with a second chamber of the burner;

a four-way switching valve located outside the burner and regeneration bodies connected to the regeneration body and including two reciprocally separate third chambers that are movable inside the switching valve to define a first position, a second position and a third position of the switching valve and wherein the regeneration body fluidically connects the switching valve and the burner;

the system being configured so that one of the two third chambers, the first chamber of said second chambers and the first chamber of the burner define a first path, while the other of the two third chambers, the second chamber of said second chambers and the second chamber of the burner define a second path different from the first path, and configured so that in the first position of the switching valve the oxydizing agent follows the first path and the combustion waste gases follow the second path in the opposite direction;

in the second position of said switching valve the oxydizing agent follows the second path and the combustion waste gases follow the first path in the opposite direction;

and in the third position of the switching valve, said valve closes the first path and the second path determining the shutdown of the combustion system.

2. A system according to claim 1, wherein the third chambers are separated by a mobile element adapted to move the third chambers to define the first position, the second position, and the third position of the switching valve.

3. A system according to claim 2, wherein the four-way switching valve comprises a first way connected to a delivery pipe of the oxydizing agent, a second way connected to the first chamber of said second chambers, a third way connected to a return pipe of the combustion waste gases and a fourth way connected to the second chamber of said second chambers.

4. A system according to claim 3, wherein said mobile element is shaped so as to close in said third position the second way and the fourth way determining the shutdown of the combustion system.

5. A system according to claim 1, wherein the burner comprises a hollow body; a diffuser for the passage of the fuel and of the oxydizing agent from the hollow body into the combustion chamber; a fuel introduction lance, longitudinally crossing the hollow body and arranged along the longitudinal axis of the burner.

6. A system according to claim 5, wherein the diffuser is provided with the following holes:
first holes which put the first chamber into communication with a first combustion zone;
second holes which put the second chamber into communication with the first combustion zone;
a central hole which puts the fuel introduction lance into communication with at least the first combustion zone;
wherein said first holes and said second holes are arranged on an external surface of the diffuser along an ellipsis having the centre on the longitudinal axis of the burner.

7. A system according to claim 6, wherein the first chamber and the second chamber of the burner are arranged transversally to the longitudinal axis and reciprocally separated from a first wall; wherein a third chamber of the burner is included arranged adjacent to the diffuser, parallel to the first chamber and to the second chamber and separated from said second chamber by a second wall; and wherein third holes are included in the diffuser which put the third chamber into communication with the first combustion zone.

8. A system according to claim 7, wherein there are provided first pipes which connect the first chamber to the first holes, and second pipes which connect the second chamber to the second holes; and wherein the first pipes and the second pipes have a respective converging end segment partially inserted in the respective first holes and second holes, defining passage sections which put the third chamber into communication with said first holes and second holes.

9. A system according to claim 7, wherein the diffuser is provided with a central cavity, defining a second combustion area, and is provided with at least one fourth hole, which puts the first chamber of the burner into communication with said second combustion area, and with at least one fifth hole which puts the second chamber of the burner into communication with said second combustion area; and wherein said central hole puts the fuel introduction lance into communication with said central cavity.

10. A system according to claim 8, wherein the diffuser is provided with a central cavity, defining a second combustion area, and is provided with at least one fourth hole, which puts the first chamber of the burner into communication with said second combustion area, and with at least one fifth hole which puts the second chamber of the burner into communication with said second combustion area; and wherein said central hole puts the fuel introduction lance into communication with said central cavity.

11. A system according to claim 9, wherein there are provided at least one third pipe, which connects the first chamber to said at least one fourth hole, and at least one fourth pipe which connects the second chamber to said at least one fifth hole; and wherein the third pipe and fourth pipe have a diameter smaller than the corresponding fourth hole and fifth hole, defining passage sections which put the third chamber into communication with said fourth hole and fifth hole.

12. A system according to claim 10, wherein there are provided at least one third pipe, which connects the first chamber to said at least one fourth hole, and at least one fourth pipe which connects the second chamber to said at least one fifth hole; and wherein the third pipe and fourth pipe have a diameter smaller than the corresponding fourth hole and fifth hole, defining passage sections which put the third chamber into communication with said fourth hole and fifth hole.

13. A system according to claim 6, wherein the first chamber and the second chamber are longitudinal chambers arranged parallel to the longitudinal axis.

14. A system according to claim 13, wherein the diffuser is provided with a central cavity, defining a second combustion area, and is provided with at least one third hole, which puts the first chamber of the burner into communication with said second combustion area, and with at least one fourth hole which puts the second chamber of the burner into communication with said second combustion area; and wherein said central hole puts the fuel introduction lance into communication with said central cavity.

15. A system according to claim 1, wherein only one fuel delivery pipe to the burner is included, provided with respective on-off valve; and wherein each of the two second chambers of the regeneration body is provided with a respective regeneration bed, formed by balls with a high percentage of alumina or other suitable ceramic material.

16. A furnace comprising a combustion chamber and at least one self-regenerative combustion system comprising
a single burner configured to introduce fuel in the combustion chamber and having a hollow body including at least two first chambers separated from each other and configured to respectively introduce oxydizing agent into said combustion chamber and receive, at the same time, combustion waste gases aspired from said combustion chamber, or vice versa;
a regeneration body connected to the burner and located outside the hollow body of the burner, the regeneration body including two second chambers separated from each other and configured respectively to preheat the oxydizing agent in its passage towards the burner and to recover heat from the combustion waste gases coming from the burner, or vice versa; a first chamber of said two second chambers being in communication with a first chamber of the burner, and a second chamber of said second chambers being in communication with a second chamber of the burner;
a four-way switching valve located outside the burner and regeneration bodies connected to the regeneration body and including two reciprocally separate third chambers that are movable inside the switching valve to define a first position, a second position and a third position of the switching valve and wherein the regeneration body fluidically connects the switching valve and the burner;
the system being configured so that one of the two third chambers, the first chamber of said second chambers and the first chamber of the burner define a first path, while the other of the two third chambers, the second chamber of said second chambers and the second chamber of the burner define a second path different from the first path,
and configured so that in the first position of the switching valve the oxydizing agent follows the first path and the combustion waste gases follow the second path in the opposite direction;
in the second position of said switching valve the oxydizing agent follows the second path and the combustion waste gases follow the first path in the opposite direction;
and in the third position of the switching valve, said valve closes the first path and the second path determining the shutdown of the combustion system.

* * * * *

UNITED STATES PATENT AND TRADEMARK OFFICE
CERTIFICATE OF CORRECTION

PATENT NO. : 9,746,178 B2  
APPLICATION NO. : 13/723727  
DATED : August 29, 2017  
INVENTOR(S) : Davide Astesiano and Claudio Leoncini Page 1 of 1

It is certified that error appears in the above-identified patent and that said Letters Patent is hereby corrected as shown below:

On the Title Page

Item (73) Assignee, should read:  
Danieli & C. Officine Meccaniche S.P.A., Buttrio (IT)  
Danieli Centro Combustion S.P.A., Cinisello Balsamo (IT)

Signed and Sealed this  
Sixteenth Day of April, 2019

Andrei Iancu  
*Director of the United States Patent and Trademark Office*